(12) United States Patent
Sultenfuss et al.

(10) Patent No.: US 9,760,141 B2
(45) Date of Patent: *Sep. 12, 2017

(54) DYNAMIC POWER DISTRIBUTION SYSTEM

(71) Applicant: Dell Products L.P., Round Rock, TX (US)

(72) Inventors: Andrew Thomas Sultenfuss, Leander, TX (US); Flaviu Cristian Chis, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,304

(22) Filed: Oct. 4, 2016

(65) Prior Publication Data

US 2017/0023993 A1 Jan. 26, 2017

Related U.S. Application Data

(63) Continuation of application No. 14/538,572, filed on Nov. 11, 2014, now Pat. No. 9,471,081, which is a
(Continued)

(51) Int. Cl.
*G06F 1/26* (2006.01)
*H02J 7/02* (2016.01)
(Continued)

(52) U.S. Cl.
CPC ............ *G06F 1/266* (2013.01); *G05F 1/66* (2013.01); *G06F 1/3206* (2013.01); *G06F 1/3212* (2013.01); *G06F 1/3215* (2013.01); *G06F 1/3218* (2013.01); *G06F 1/3253* (2013.01); *G06F 1/3265* (2013.01); *G06F 1/3296* (2013.01); *H02J 7/007* (2013.01); *H02J 7/025* (2013.01)

(58) Field of Classification Search
CPC ..................................................... G06F 1/3215
See application file for complete search history.

(56) References Cited

U.S. PATENT DOCUMENTS 4,233,553 A 11/1980 Prince, Jr. et al.
5,570,002 A 10/1996 Castleman
(Continued)

*Primary Examiner* — Albert Wang
(74) *Attorney, Agent, or Firm* — Haynes and Boone, LLP

(57) ABSTRACT

A dynamic power distribution system includes a dynamic powering system that provides dynamic power, an external device, and a powered system that is coupled to the external device and engaging the dynamic powering system. The powered system determines a power budget using the dynamic power received from the dynamic powering system. The powered system also determines a powered system component load for a plurality of powered system components, receives a power request from the external device, and retrieves at least one power distribution rule. Using the powered system component load, the power request, and the at least one power distribution rule, and powered system allocates and distributes a first portion the power budget to the external device, and may also allocate and distribute a second portion the power budget to at least one of the plurality of powered system components. The dynamic powering system may be a wireless powering system.

20 Claims, 11 Drawing Sheets

Related U.S. Application Data continuation-in-part of application No. 13/355,286, filed on Jan. 20, 2012, now Pat. No. 9,037,877.

(51) Int. Cl.
*G06F 1/32* (2006.01)
*G05F 1/66* (2006.01)
*H02J 7/00* (2006.01)

(56) References Cited

U.S. PATENT DOCUMENTS

| | | |
|---|---|---|
| 5,842,027 A | 11/1998 | Oprescu et al. |
| 6,097,175 A | 8/2000 | Yoon |
| 6,357,011 B2 | 3/2002 | Gilbert |
| 6,700,808 B2 | 3/2004 | MacDonald et al. |
| 6,791,853 B2 | 9/2004 | Afzal et al. |
| 7,293,187 B2 | 11/2007 | Ono |
| 7,441,127 B2 | 10/2008 | Sugasawa |
| 7,603,571 B2 | 10/2009 | Sauber |
| 7,877,618 B2 | 1/2011 | Lewis et al. |
| 8,313,209 B2 | 11/2012 | Connor et al. |
| 8,909,958 B2 | 12/2014 | Schindler |
| 9,037,887 B2 | 5/2015 | Gupta et al. |
| 9,367,115 B2 | 6/2016 | Sultenfuss et al. |
| 2004/0075419 A1 | 4/2004 | Massey et al. |
| 2005/0246557 A1 | 11/2005 | Vanzante |
| 2007/0234087 A1 | 10/2007 | Cromer et al. |
| 2012/0246458 A1* | 9/2012 | Jain .................. G06F 1/3253 713/100 |
| 2013/0179697 A1 | 7/2013 | Nicholas et al. |
| 2013/0191674 A1 | 7/2013 | Sultenfuss et al. |
| 2013/0305064 A1 | 11/2013 | Fossati et al. |
| 2013/0320769 A1 | 12/2013 | Sawyers |
| 2015/0220133 A1 | 8/2015 | Sultenfuss et al. |
| 2015/0263548 A1 | 9/2015 | Cooper et al. |
| 2015/0364943 A1 | 12/2015 | Vick et al. |
| 2016/0132065 A1 | 5/2016 | Sultenfuss et al. |

\* cited by examiner

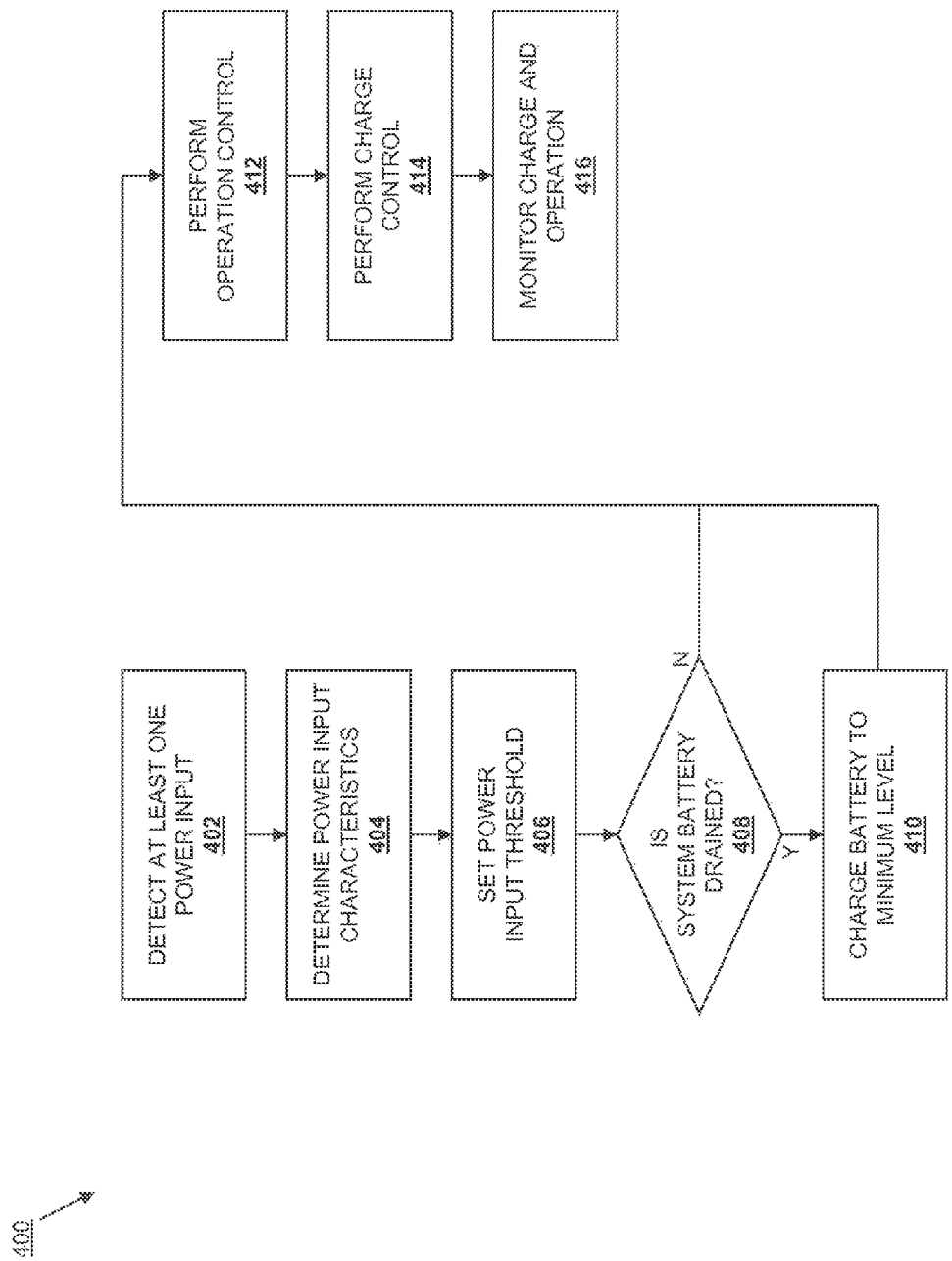

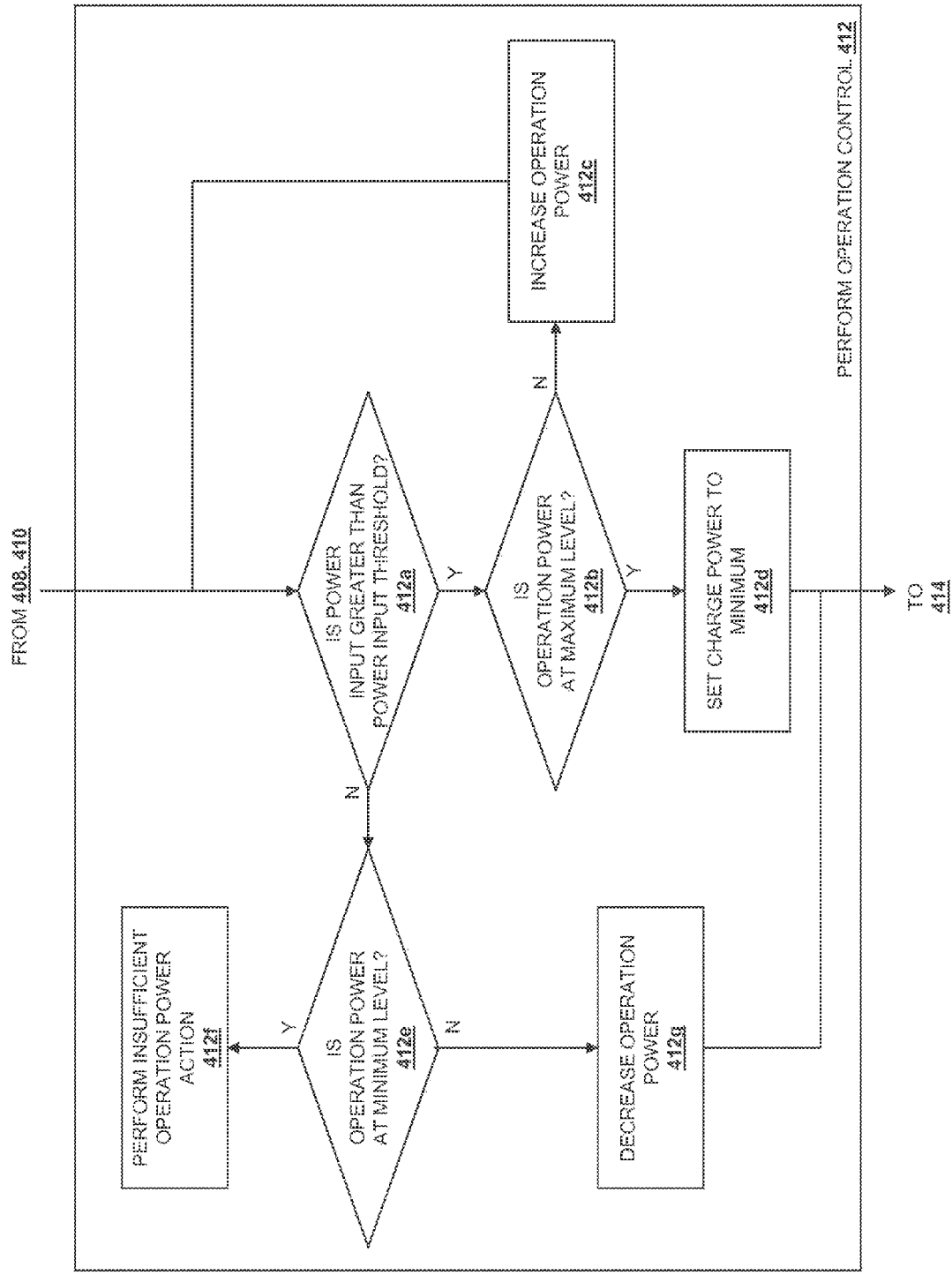

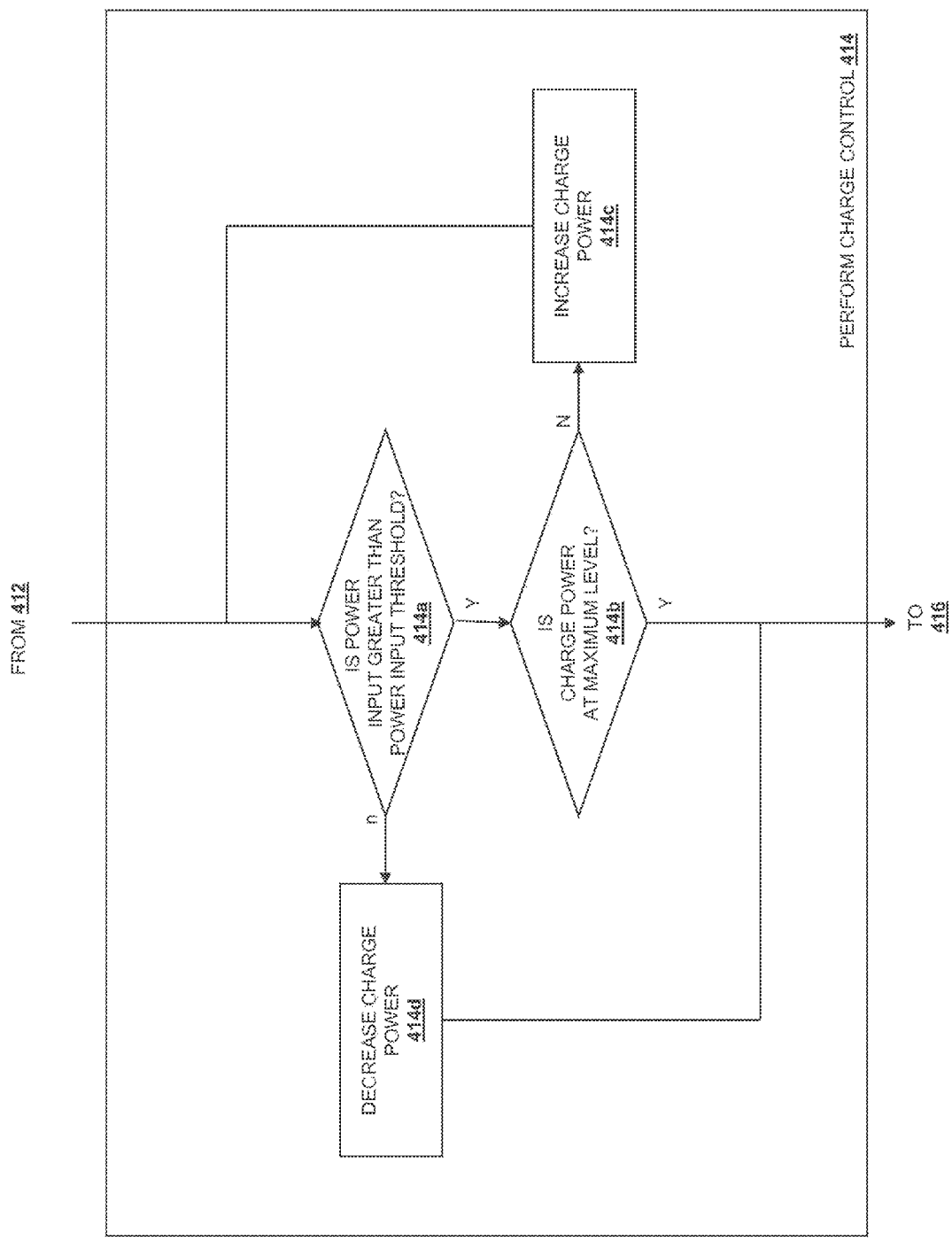

DYNAMIC POWER DISTRIBUTION SYSTEM

CROSS REFERENCE TO RELATED APPLICATIONS

This application is a Continuation Application of U.S. patent application Ser. No. 14/538,572, filed on Nov. 11, 2014, entitled "Dynamic Power Distribution System," which is a Continuation-In-Part Application of U.S. patent application Ser. No. 13/355,286 filed on Jan. 20, 2012, entitled "Power Input Utilization System," now U.S. Pat. No. 9,037,877, issued on May 19, 2015. This application is related to U.S. patent application Ser. No. 14/688,787, filed on Apr. 16, 2015, entitled "Power Input Utilization System," now U.S. Pat. No. 9,367,115, issued on Jun. 14, 2016, and U.S. patent application Ser. No. 15/153,536, filed on May 12, 2016, entitled "Power Input Utilization System". The entire disclosures of which are incorporated herein by reference.

BACKGROUND

The present disclosure relates generally to information handling systems (IHSs), and more particularly to dynamic power distribution systems for an IHS.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The conversion and/or utilization of power inputs by IHSs and, particularly, mobile/portable IHSs, is typically dictated by narrow or limited capabilities of the power inputs (e.g., the power source, the power adapter, etc.) Conventional power inputs may be numerous, and include IHS docks, automobiles, airliners, direct current (DC) adapters, universal serial bus (USB) power sources, wireless power sources, solar power sources, fuel cell power sources, and/or a variety of other power inputs known in the art. Currently IHS do not have the ability to utilize these numerous and widely differing power inputs in an efficient and consistent manner.

Furthermore, IHSs may be powered and/or have their battery charged using power from a powering system that is dynamic or changing over time. For example, some of the powering systems that provide the power inputs discussed above may include wireless powering systems may provide power that is dynamic such that the amount of power supplied to a wireless powered IHS may, at least at during some time periods, be insufficient to adequately power all of the IHS components in the IHS and/or connected external devices. Conventional powered IHS systems are designed for relatively high levels of power that are sufficient to adequately power all of the IHS components in the IHS and/or its connected devices, and the use of dynamic and limited power supplies can introduce issues with regard to IHS and/or connected external device availability.

Accordingly, it would be desirable to provide an improved power distribution system for use with dynamic power sources.

SUMMARY

According to one embodiment, an information handling system (IHS) includes a plurality of IHS components; an external device connection; a power receiving module; a processing system that is coupled to the plurality of IHS component, the external device connection, and the power receiving module; and a memory system that includes instructions that, when executed by the processing system, cause the processing system to provide a power distribution engine that is configure to: determine a power budget using a dynamic power that is received through the power receiving module; determine an IHS component load from the plurality of IHS components; receive a power request through the external device connection; retrieve at least one power distribution rule from the memory system; and allocate and distribute a first portion the power budget through the external device connection based on the IHS component load, the power request, and the at least one power distribution rule.

BRIEF DESCRIPTION OF THE DRAWINGS

FIG. 4a is a flow chart illustrating an embodiment of a method for power utilization.

FIG. 4b is a flow chart illustrating an embodiment of performing operation control in the method for power utilization of FIG. 4a.

FIG. 4c is a flow chart illustrating an embodiment of performing charge control in the method for power utilization of FIG. 4a.

FIG. 4d is a flow chart illustrating an embodiment of monitoring charge and operation in the method for power utilization of FIG. 4a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
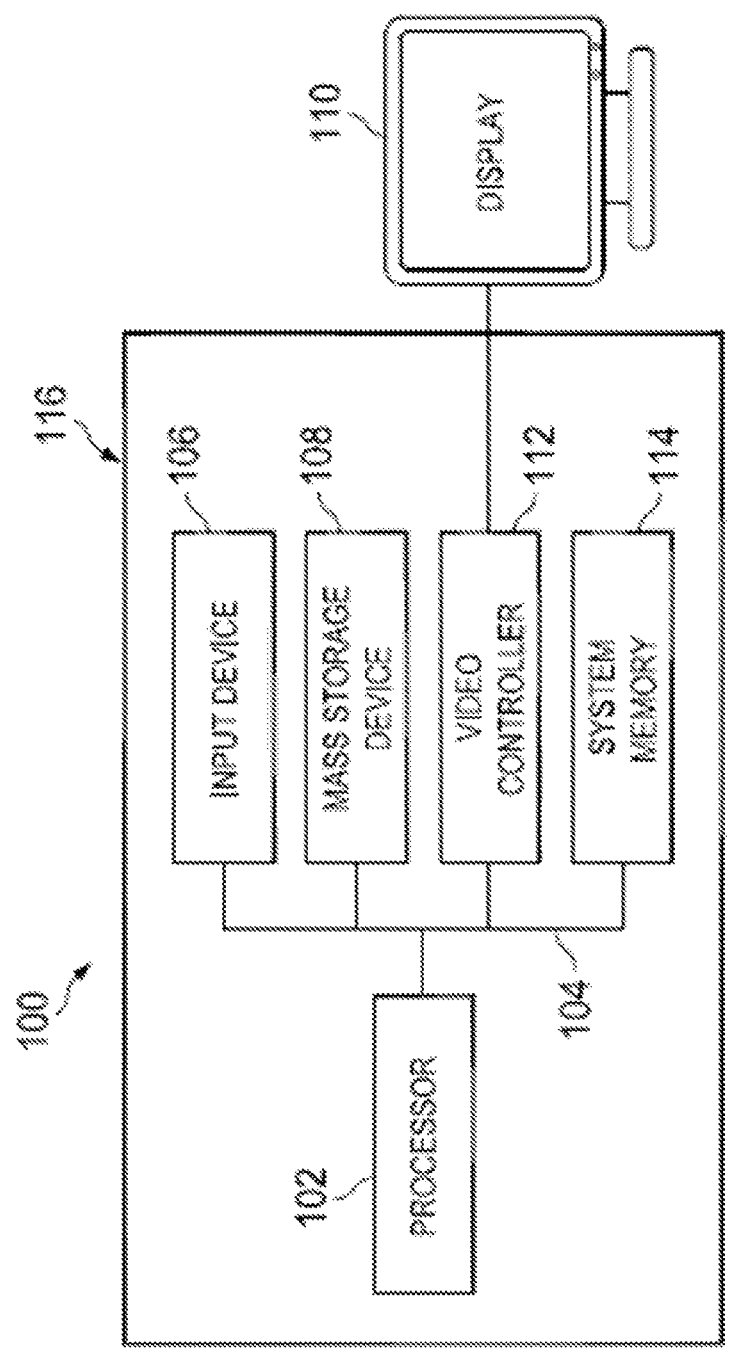
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
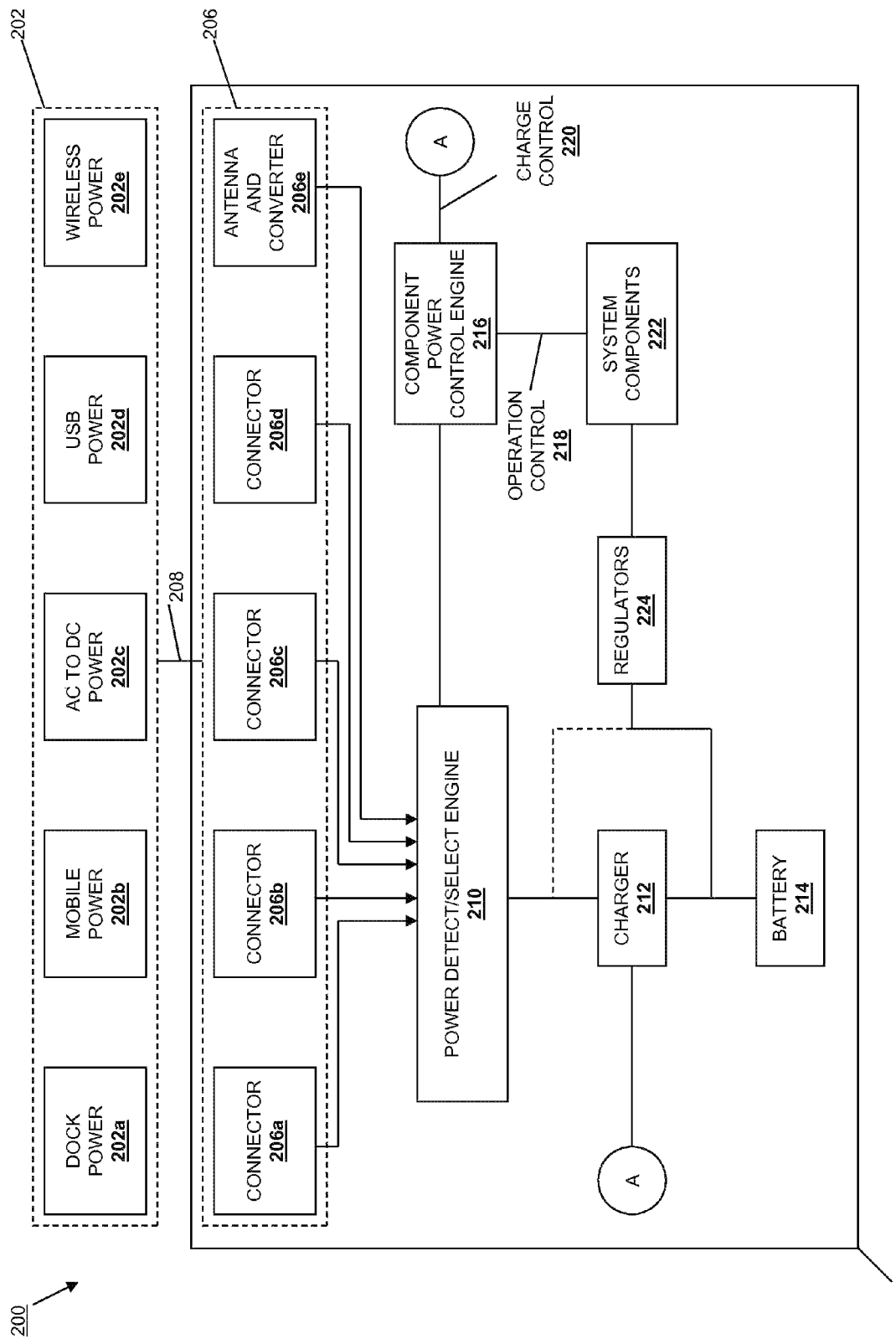
FIG. 2 is a schematic view illustrating an embodiment of a power input utilization system.

Referring now to FIG. 2, a power input utilization system 200 is illustrated. The power input utilization system includes a plurality of power inputs 202 such as, for example, a dock power input 202a, a mobile power input 202b, an alternating current (AC) to direct current (DC) power input 202c, a universal serial bus (USB) power input 202d, a wireless power input 202e, and/or a variety of other power inputs known in the art. For example, the dock power input 202a in the illustrated embodiment may include a power input that is operable to provide power to a mobile/portable IHS through a docking station that connects the mobile/portable IHS to a plurality of peripheral devices such as, for example, a keyboard, a mouse, a display device, and/or a variety of other peripheral devices known in the art. In another example, the mobile power input 202b in the illustrated embodiment may include a power input that is operable to provide power to an IHS from an automobile (e.g., through a conventional 12 volt auxiliary power outlet (previously used for cigarette lighters) in the automobile), an airplane, and/or a variety of other mobile power sources known in the art. In another example, the AC to DC power input 202c in the illustrated embodiment may include a power input that is operable to convert power from an AC power source in order to provide a DC power input to an IHS (e.g., a conventional power adapter). In another example, the USB power input 202d in the illustrated embodiment may include a power input that is operable to provide power to a first IHS from an IHS battery in a second IHS through a USB connector on the second IHS. In another example, the wireless power input 202e in the illustrated embodiment may include a power input that is operable to provide power wirelessly to an IHS. While a plurality of power inputs have been described above, one of skill in the art will recognize that any power input may fall within the scope of the present disclosure. Furthermore, one of skill in the art will recognize that the power inputs 202a, 202b, 202c, 202d, and 202e may each provide power having a wide variety of voltages, currents, and/or other power characteristics relative to the other power inputs.

The power input utilization system 200 also includes an IHS 204. In an embodiment, the IHS 204 may be the IHS 100, discussed above with reference to FIG. 1, and may include some or all of the IHS components discussed above including the chassis 116, the processor 102, the mass storage device 108, the system memory 114, other non-transitory computer-readable mediums, and/or a variety of other IHS components known in the art. The IHS 204 includes a plurality of power input connectors 206. For example, a connector 206a may be operable to connect the IHS 204 to the dock power input 202a, a connector 206b may be operable to connect the IHS 204 to the mobile power input 202b, a connector 206c may be operable to connect the IHS 204 to the AC to DC power input 202c, a connector 206d may be operable to connect the IHS 204 to the USB power input 202d, and an antenna and converter 206e may be operable to connect the IHS 204 to the wireless power input 202e. In the illustrated embodiment in FIG. 2, a connection 208 is illustrated as providing the connection between the power inputs 202a-e and the power input connectors 206a-e, and one of skill in the art should recognize that the connection 208 is meant to illustrate a connection between any number of the power inputs 202a-e and their respective power input connectors 206a-e (e.g., the IHS 204 may be connected to one or more of the power inputs 202a-e through the power input connectors 206a-e at a given time.)

Each of the power input connectors 206a-e is coupled to a power detect/select engine 210. In an embodiment, the power detect/select engine 210 may include analog circuits to detect and enable a power source. Instructions may be stored on a non-transitory computer-readable medium and, when executed by a processor, may cause the processor to perform additional functions of the power detect/select engine discussed below. The power detect/select engine 210 is coupled to a charger 212 that is coupled to a battery 214. The power detect/select engine 210 is also coupled to a component power control engine 216. In an embodiment, the component power control engine 216 includes instructions, stored on a non-transitory computer-readable medium, that when executed by a processor cause the processor to perform the functions of the component power control engine 216 discussed below. In an embodiment, the power detect/select engine 210 and the component power control engine 216 provide a power utilization engine that provides operation control 218 of components in the IHS 204 and/or charge control 220 of the battery 214, as discussed in further detail below. The component power control engine 216 is coupled to the charger 212 and one or more system components 222 in the IHS 204. In an embodiment, the one or more system components 222 may include processors, memory modules, storage drives, communication devices and/or a variety of other system components known in the art. In an embodiment, power control of system components other than the charger 212 may be implemented in the system host processor using information from the component power control engine 216. Using the information that is implicitly or explicitly provided in response to the selection of the power source, discussed in detail below, one of skill in the art will recognize how the operation control of the system components 222 and/or charge control of the battery 214 may be implemented. One or more regulators 224 provide power to the one or more system components 222. The regulators 224 may receive input power from the battery 214 and optionally the power detect/select engine 210.

Figure 3:
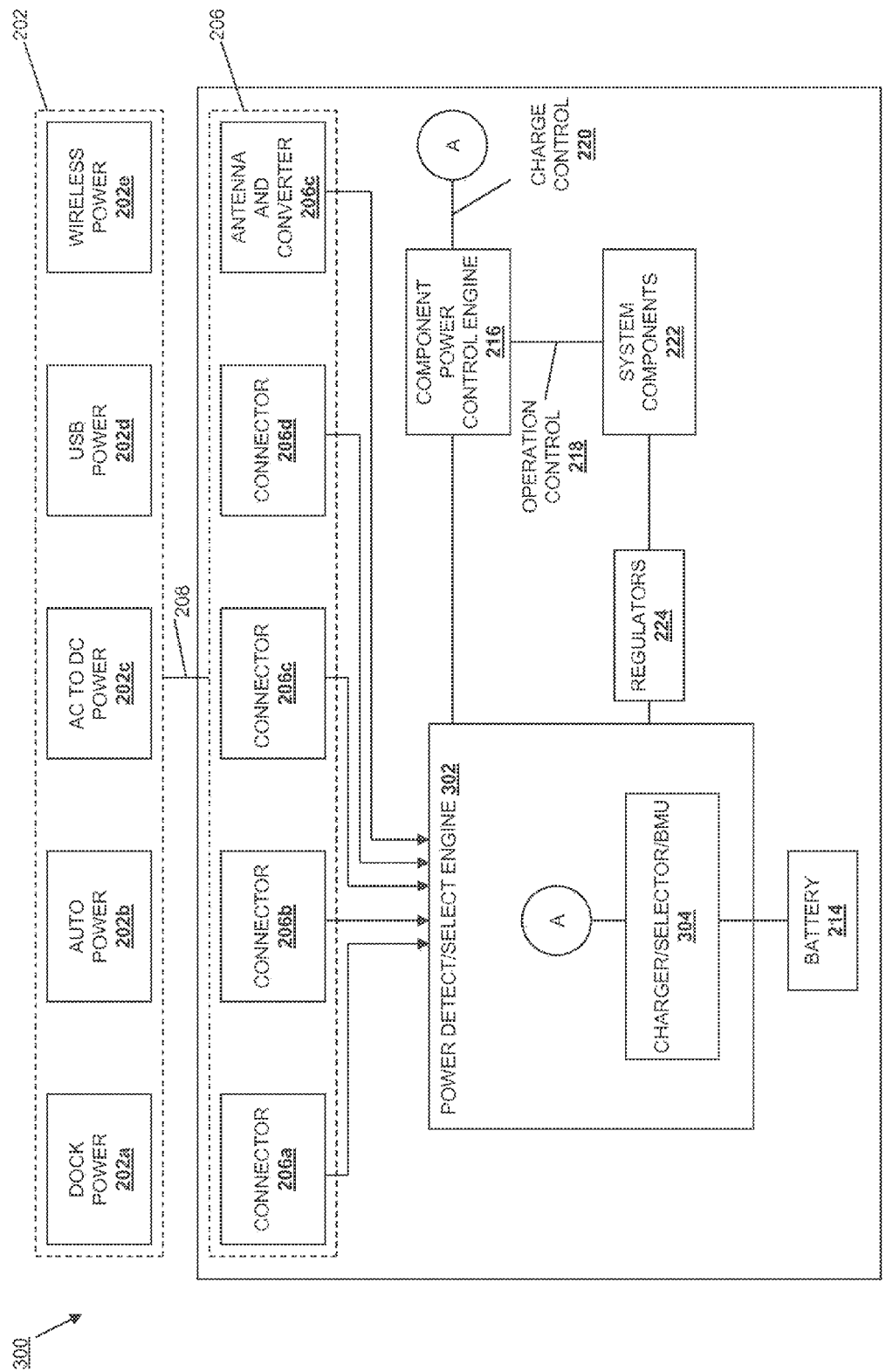
FIG. 3 is a schematic view illustrating an embodiment of a power input utilization system.

Referring now to FIG. 3, a power input utilization system 300 is illustrated that is substantially similar in structure and operation to the power utilization system 200, discussed above with reference to FIG. 2, with the provision of a power detect/select engine 302 and a charger/selector/battery management unit (BMU) 304 replacing the power detect/select engine 210 and the charger 212. Similarly as discussed above, in an embodiment, the power detect/select engine 302 may include analog circuits to detect and enable a power source. Instructions may be stored on a non-transitory computer-readable medium and, when executed by a processor, may cause the processor to perform the additional functions of the power detect engine discussed below. However, in contrast to the power detect/select engine 210, the power detect/select engine 302 includes an integrated charger in the charger/selector/battery management unit (BMU) 304 that is coupled to the battery 214. The embodiments illustrated in FIGS. 2 and 3 are provided for ease of understanding and described with regard to the method 400, discussed below, using multiple blocks and sequential steps. However, one of skill in the art will recognize that analog circuit alternatives, such as the embodiment illustrated and described with reference to FIG. 5, may be integrated in a single circuit and allow some or all of the steps of the method 400 to be performed simultaneously. In the method 400 discussed below, operation of the power input utilization system will be described with regard to the power input utilization system 200 illustrated in FIG. 2. However, one of skill in the art will recognize how the power input utilization system 300 may perform the steps of the method 400 without departing from the scope of the present disclosure.

Referring now to FIGS. 2 and 4a, a method 400 for power utilization is illustrated. The method 400 begins at block 402 where at least one power input is detected. In an embodiment, one of more of the plurality of power inputs 202 may be coupled to respective power input connectors 206 on the IHS 204, and the power detect/select engine 210 may detect those one or more connections. For example, the dock power input 202a may be connected to the connector 206a, the mobile power input 202b may be connected to the connector 206b, the AC to DC power input 202c may be connected to the connector 206c, the USB power input 202d may be connected to the connector 206d, the wireless power input 202e may be connected to the antenna and converter 206e and, in response, the power detect/select engine 210 will detect the connection or connections. In an embodiment, at block 402 of the method 400, only one power input may be connected to a connector on the IHS 204 to provide a single source of power to the IHS 204. In another embodiment, multiple power inputs may be connected to respective connectors on the IHS 204 to provide multiple sources of power to the IHS 204.

The method 400 then proceeds to block 404 where one or more power input characteristics are determined. In an embodiment, the power detect/select engine 210 may include analog circuits to detect and enable a power source. Instructions may be stored on a non-transitory computer-readable medium and, when executed by a processor, may cause the processor to determine the one or more power input characteristics of the power inputs detected in block 402 of the method 400. For example, one or more of the power inputs detected in block 402 may be "smart" power inputs that, along with power, provide characteristics about the power such as nominal and minimum voltage, maximum current, and/or a variety of other power characteristics known in the art, and the power detect/select engine 210 receives those power input characteristics in block 404 of the method 400. In another example, one or more of the power inputs detected in block 402 may be "dumb" power inputs that simply provide power, and the power detect/select engine 210 may include analog circuits to detect and enable a power source. Instructions may be stored on a non-transitory computer-readable medium and, when executed by a processor, may cause the processor to analyze that power to determine one or more power characteristics such as nominal and minimum voltage, maximum current, and/or a variety of other power characteristics known in the art. In an embodiment, default power characteristics for "dumb" power sources may be stored in a storage and accessed by the processor at block 404. In an embodiment, the power characteristics determined in block 404 may be power characteristics for power provided from a single power input. In another embodiment, the power characteristics determined in block 404 may be power characteristics for a total power provided from a plurality of power inputs (e.g., the power characteristics may be determined for a total power provided from a plurality of different power inputs that each provides a discrete power source for the IHS 204.) In another embodiment, the power characteristics determined in block 404 may be power characteristics for power provided from each of a plurality of power inputs (e.g., power characteristics may be determined for each of a plurality of discrete power sources provided from respective power inputs connected to the IHS 204) in order, for example, to select the highest power and/or the optimal power source for the IHS 204.

The method 400 then proceeds to block 406 where one or more power input thresholds are set. In an embodiment, the power detect/select engine 210 may include analog circuits to detect and enable a power source. Instructions may be stored on a non-transitory computer-readable medium and, when executed by a processor, may cause the processor to use the one or more power input characteristics determined in block 404 to set one or more power thresholds. In an embodiment, the power detect/select engine 210 may include information about the operating states available to the IHS 204 in response to different amounts of power that are available to the IHS 204, and at block 406, the power detect/select engine 210 may use the power input characteristics determined in block 404 to set a power input threshold below which the IHS 204 may not operate properly as a result of lack of power. For example, the power input threshold set in block 406 may include a percentage of the nominal voltage received from the one or more power inputs, a minimal voltage information input from a "smart" power source, and/or a variety of other power input thresholds known in the art.

The method 400 then proceeds to decision block 408 where it is determined whether a system battery is drained. One of skill in the art will recognize that any power input utilization system may be inoperable if the system battery is drained below a minimum charge level, as system components may be inoperable with the system battery below that minimum charge level. Thus, in an embodiment, at decision block 408, the power detect/select engine 210 may check the battery 214 to determine whether the battery 214 has been drained (e.g., that the battery 214 includes a charge that is below a minimum charge level.) If, at decision block 408, the power detect/select engine 210 determines that the battery 214 is drained, the method 400 proceeds to block 410 where the battery is charged to a minimum level. In an embodiment, at block 410, the power detect/select engine 210 provides power received from the one or more power inputs 202 to the charger 212 and allows the charger 212 to charge the battery 214 to a minimum charge level before other IHS operations are initiated.

Referring now to FIGS. 4a and 4b, if at decision block 408 it is determined that the system battery is not drained, or following block 410, the method 400 proceeds to block 412 where operation control is performed. At or before block 412, a plurality of operation characteristics may be determined for the plurality of system components 222 in the IHS 204 using the one or more power input characteristics determined in block 404. In an embodiment, the component power control engine 216 includes instructions, stored on a non-transitory computer-readable medium, that when executed by a processor cause the processor to use the one or more power input characteristics determined in block 404 to determine operation characteristics for the plurality of system components 222. In one embodiment, the operation characteristics may be determined for the plurality of system components operating together. In another embodiment, operation characteristics may be determined for each system component 222. In one example, the component power control engine 216 may determined a plurality of operating levels for the plurality of system components 222 that include a minimum operation level, and maximum operation level, and/or a plurality of intermediate operation levels between the minimum operation level and the maximum operation level. In an embodiment, the determination of operating characteristics for current processors such as, for example, those provided by Intel Corporation, may include capping their operating power states (P-states) or disabling a "turbo-mode". Using the information that is implicitly or explicitly provided in response to the selection of the power source as describe herein, one of skill in the art will recognize a variety of ways in which the operation characteristics of the system components 222 may be determined. In an embodiment, the component power control engine 216 includes instructions, stored on a non-transitory computer-readable medium, that when executed by a processor cause the processor, at block 412, to retrieve a plurality of component characteristics from the plurality of system components 222 for use with the one or more power input characteristics to determine the operation characteristics for the plurality of system components 222. For example, the component power control engine 216 may retrieve from the system components 222, or from a database in the IHS 204 (not illustrated), a plurality of component characteristics that include, for example, power consumption for processor operating states, memory technology type (e.g., low power, standard, etc.), storage technology type (e.g., solid state, hard disk drive (HDD), etc.), and/or a variety of other component characteristics known in the art. The component power control engine 216 may then use the component characteristics with the power input characteristics to determine the operation characteristics. For example, the determination of operation characteristics for a particular processor may include limiting the processor to less than peak performance by capping its maximum P-state. Thus, a plurality of operation characteristics for the system components 222 may be determined at block 412 that are based on the power input characteristics determined in block 404 and, in some embodiments, component characteristics of the system components 222.

The method 400 may then perform operation control at block 412, beginning at decision block 412a where it is determined whether a power input is greater than a power input threshold. In an embodiment, the power detect/select engine 210 may include analog circuits to detect and enable a power source. Instructions may be stored on a non-transitory computer-readable medium and, when executed by a processor, may cause the processor to compare the power received from the one or more power inputs 202 to the power input threshold set in block 406 of the method 400 to determine whether the power currently being received by the IHS 204 is above the power input threshold. If, at decision block 412a, the power detect/select engine 210 determines that the power received from the one or more power inputs 202 is greater than the power input threshold, the method 400 proceeds to decision block 412b where it is determined whether operation power has reached a maximum level. In an embodiment, the component power control engine 216 may include analog circuits to detect and enable a power source. Instructions may be stored on a non-transitory computer-readable medium and, when executed by a processor, may cause the processor to determine whether the power provided to the system components 222 has reached a maximum level. For example, in response to the power from the one or more power inputs 202 being above the power input threshold, the component power control engine 216 is operable to cause that power to be supplied to the system components 222. At decision block 412b, the component power control engine 216 may then compare the power being supplied to the system components 222 to the operation characteristics for the system components 222 to determine whether the system components are operating at a maximum operation level included in the operation characteristics.

If, at decision block 412b, it is determined that operation power has not reached a maximum level, the method 400 proceeds to block 412c where the power supplied to the system components (e.g., the "operation power") is allowed to increase. In an embodiment, the component power control engine 216 may include analog circuits to detect and enable a power source. Instructions may be stored on a non-transitory computer-readable medium and, when executed by a processor, may cause the processor to allow the power provided to the system components 222 to increase. For example, at block 412c, the component power control engine 216 may allow an increase in the power used by the system components 222 according to the operation characteristics (e.g., the power supplied may be sufficient to increase the operation of the system components from one intermediate operation level to a higher intermediate operation level). The method 400 then returns to decision block 412a to determine whether the power received from the one or more power inputs is greater than the power input threshold. Thus, decision blocks 412a, 412b and 412c allow the power utilization engine to increase the power provided to the system components 222 until the system components are operating at a maximum operation level wherein the maximum operation level is dependent on the selected power source(s) characteristics. If, at decision block 412b, it is determined that the operation power is at a maximum level, the method 400 proceeds to block 412d where charge power is set to a minimum level. In an embodiment, the power detect/select engine 210 includes instructions, stored on a non-transitory computer-readable medium, that when executed by a processor cause the processor to provide power from the one or more power inputs 202 to the charger 212 and instruct the charger to provide a charge to the battery 214 at a minimum charge level. Thus, once the power provided by the one or more power inputs is sufficient to operate the system components at a maximum level, power from the one or more power inputs is allocated for charging the battery 214.

If, at decision block 412a, it is determined that the power received from the one or more power inputs is below the power input threshold, the method 400 proceeds to decision block 412e where it is determined whether operation power is at a minimum level. In an embodiment, the component power control engine 216 may include analog circuits to detect and enable a power source. Instructions may be stored on a non-transitory computer-readable medium and, when executed by a processor, may cause the processor to determine whether the power provided to the system components 222 is at a minimum level. For example, the component power control engine 216 may compare the power provided from the one or more power inputs 202 to the system components 222 to the operation characteristics of the system components 222 to determine whether that power being provided is not sufficient to operate the components at a minimum operation level. If at decision block 412e, it is determined that the operation power is at a minimum level, the method 400 proceeds to block 412f where an insufficient operation power action is performed. In an embodiment, the power utilization engine may include analog circuits to detect and enable a power source. Instructions may be stored on a non-transitory computer-readable medium and, when executed by a processor, may cause the processor to perform the insufficient operation power action that may include, for example, checking a battery status and shutting down one or more of the system components 222 (e.g., in response to the system component(s) being operated followed by the power received from the one or more power inputs falling below the power input threshold), not turning on one or more system components 222 (e.g., in response to the IHS 204 being connected to a power input that does not provide enough power to properly operate the system component(s)), warning the user and shutting down the system, and/or a variety of other insufficient operation power actions known in the art.

If, at decision block 412e, it is determined that the operation power is not at a minimum level (e.g., the power received from the power inputs 202 is sufficient to power the system components 222), the method 400 proceeds to block 412g where the operation power is decreased. In an embodiment, the component power control engine 216 may include analog circuits to detect and enable a power source. Instructions may be stored on a non-transitory computer-readable medium and, when executed by a processor, may cause the system components 222 to reduce the power consumed from the one or more power inputs 202. Thus, if the power received from the one or more power inputs 202 is below the power input threshold and the system components 222 are still operating above a minimum operation level, the power provided to those system components 222 is decreased. In an embodiment, power may be decreased by capping or otherwise limited a processor P-state to a lower level (e.g., relative to the current P-state of the processor.)

Referring now to FIGS. 4a, 4b, and 4c, following blocks 412d or 412g, the method 400 proceeds to block 414 where a charge control is performed. At block 414, a plurality of charging characteristics may be determined for the battery 214 using the one or more power input characteristics determined in block 404. As used herein, the battery 214 may be considered one of the system components of the IHS 204, and the charging characteristics of the battery 214 may be considered an operation characteristic for the battery 214/system component. In an embodiment, the component power control engine 216 may include analog circuits to detect and enable a power source. Instructions may be stored on a non-transitory computer-readable medium and, when executed by a processor, may cause the processor to use the one or more power input characteristics determined in block 404 to determine charging characteristics for the battery 214. In one example, the component power control engine 216 may determine the battery charge level and select a plurality of charging rates for the battery 214 that include a minimum charge rate, a maximum charge rate, and/or a plurality of intermediate charge rates between the minimum charge rate and the maximum charge rate. The charging process of a battery is complex and may include many factors that can impact battery life, and the power utilization system is operable to consider power source capability, battery charge level, and operation power requirements of system components in determining the charge rate. In an embodiment, the component power control engine 216 may include analog circuits to detect and enable a power source. Instructions may be stored on a non-transitory computer-readable medium and, when executed by a processor, may cause the processor, at block 414, to retrieve a plurality of battery characteristics from the battery 214 for use with the one or more power input characteristics to determine charging characteristics for the battery 214. For example, the component power control engine 216 may retrieve from the battery 214, or from a database in the IHS 204 (not illustrated), a plurality of battery characteristics that include battery type (e.g., lithium ion, lithium polymer, etc.), battery capacity, and/or a variety of battery characteristics known in the art. The component power control engine 216 may then use the battery characteristics with the power input characteristics to determine the charging rates. For example, a charge rate desirable for a given battery may require more power than can be provided by a particular power source under desired operation levels of other system components, while a more capable power source may support the optimum charge rate, and the system allows for the characterizations of those variable in determining the charge rate to be supplied to a battery. Thus, a plurality of charging characteristics for the battery 214 may be determined at block 414 that are based on the power input characteristics determined in block 404 and, in some embodiments, battery characteristics of the battery 214.

The method 400 may then perform charge control at block 414. Beginning at decision block 414a, it is determined whether a power input is greater than a power input threshold. As discussed above, the power detect/select engine 210 is operable to compare the power received from the one or more power inputs 202 to the power input power input threshold set in block 406 to determine whether the power currently being received by the IHS 204 is above the power input threshold. If, at decision block 414a, the power detect/select engine 210 determines that the power received from the one or more power inputs 202 is greater than the power input threshold, the method 400 proceeds to decision block 414b where it is determined whether charge power is at a maximum level. In an embodiment, the component power control engine 216 may include analog circuits to detect and enable a power source. Instructions may be stored on a non-transitory computer-readable medium and, when executed by a processor, may cause the processor to determine whether the charge provided to the battery 214 is at a maximum charge level.

If, at decision block 414*b*, it is determined that the charge provided to the battery 214 is not at a maximum charge level, the method 400 proceeds to block 414*c* where the charge provided to the battery 214 (e.g., the "charge power") is increased. In an embodiment, the power detect/select engine 210 may include analog circuits to detect and enable a power source. Instructions may be stored on a non-transitory computer-readable medium and, when executed by a processor, may cause the processor to provide power to the charger 212 and instruct the charger 212 to increase the charge provided to the battery 214. For example, at block 414*c*, the component power control engine 216 may increase the power provided from the charger 212 to the battery 214 according to the charging characteristics (e.g., the power supplied may be sufficient to increase the charge level from one intermediate charge level to a higher intermediate charge level.) The method 400 then returns to decision block 414*a* to determine whether the power received from the one or more power inputs is greater than the power input threshold. Thus, blocks 414*a*, 414*b* and 414*c* allow the power utilization engine to increase the charge provided to the battery 214 until the battery is being charged at a maximum charge level. If, at decision block 414*a*, it is determined that the power received from the one or more power inputs 202 is not greater than the power input threshold, the method 400 proceeds to block 414*d* where charge power is decreased. In an embodiment, the power detect engine may include analog circuits to detect and enable a power source. Instructions may be stored on a non-transitory computer-readable medium and, when executed by a processor, may cause the processor to decrease the power (from the one or more power inputs) provided to the charger 212 and instruct the charger to decrease a charge provided to the battery 214.

Figure 4D:
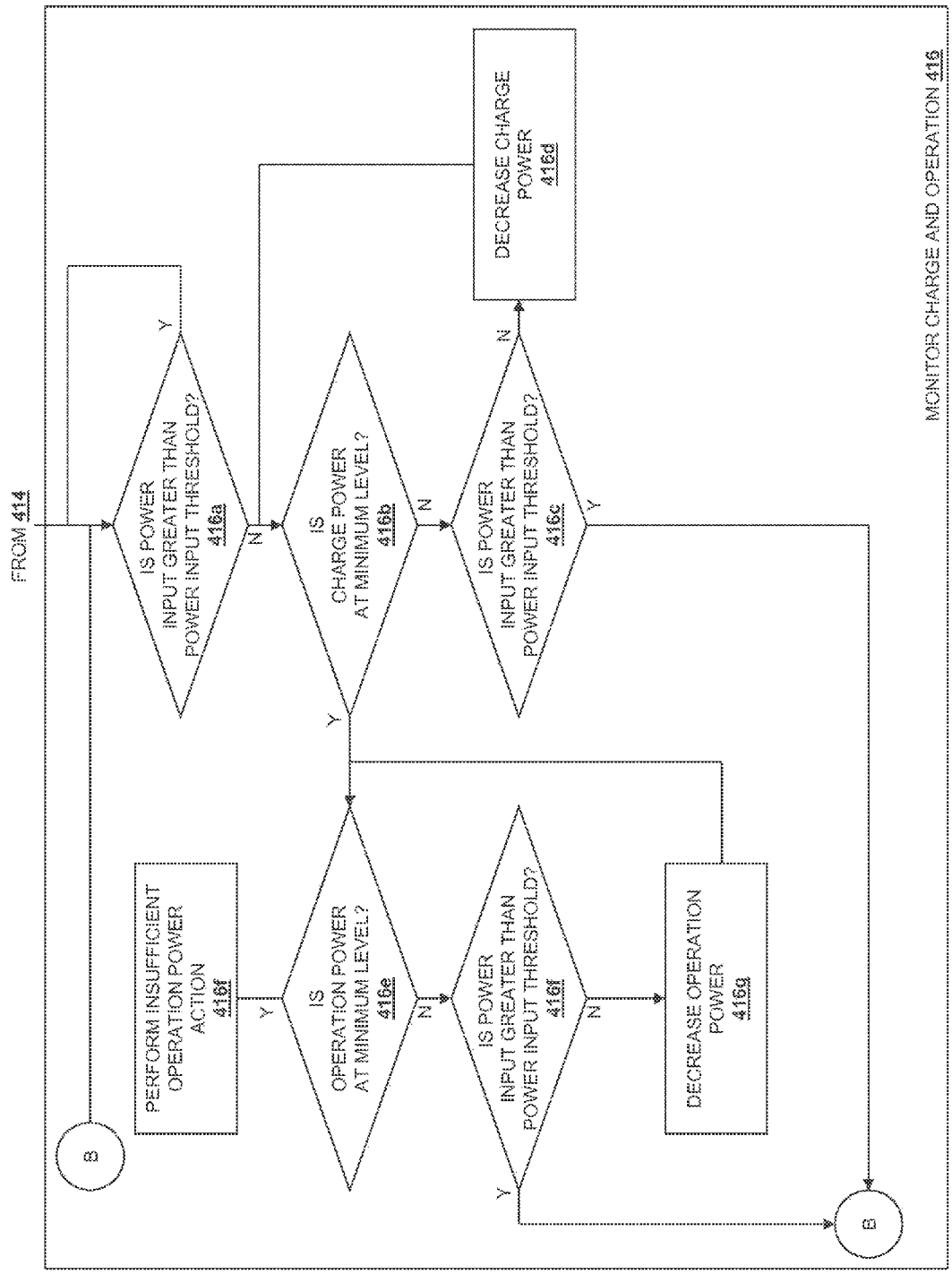

Referring now to FIGS. 4*a*, 4*c*, and 4*d*, following blocks 414*b* or 414*d*, the method 400 proceeds to block 416 where charge and operation are monitored. The charge and operation monitoring begins at decision block 416*a* where it is determined whether a power input is greater than a power input threshold. As discussed above, the power detect/select engine 210 is operable to compare the power received from the one or more power inputs 202 to the power input power input threshold set in block 406 of the method 400 to determine whether the power currently being received by the IHS 204 is above the power input threshold. If, at decision block 416*a*, the power detect/select engine 210 determines that the power received from the one or more power inputs 202 is greater than the power input threshold, the method 400 returns to decision block 416*a* and continues to monitor the power received from the one or more power inputs 202 with respect to the power input threshold.

If, at decision block 416*a*, it is determined the power received from the one or more power inputs 202 is not greater than the power input threshold, the method 400 proceeds to decision block 416*b* where it is determined whether charge power is at a minimum level. In an embodiment, the component power control engine 216 may include analog circuits to detect and enable a power source. Instructions may be stored on a non-transitory computer-readable medium and, when executed by a processor, may cause the processor to determine whether the charge provided to the battery 214 is at a minimum charge level. If, at decision block 416*b*, it is determined that the charge power is not at a minimum level (e.g., the charge provided to the battery 214 is above a minimum charge level), the method 400 proceeds to decision block 416*c* where it is determined whether a power input is greater than a power input threshold. As discussed above, the power detect/select engine 210 is operable to compare the power received from the one or more power inputs 202 to the power input power input threshold set in block 406 of the method 400 to determine whether the power currently being received by the IHS 204 is above the power input threshold. If, at decision block 416*c*, the power detect/select engine 210 determines that the power received from the one or more power inputs 202 is not greater than the power input threshold, the method 400 proceeds to block 416*d* where charge power is decreased. In an embodiment, the power detect engine may include analog circuits to detect and enable a power source. Instructions may be stored on a non-transitory computer-readable medium and, when executed by a processor, may cause the processor to decrease the power provided from the one or more power inputs to the charger 212 and instruct the charger 212 to decrease a charge provided to the battery 214. The method 400 then returns to decision block 416*b*. Thus, blocks 416*b*, 416*c* and 416*d* allow the power utilization engine to decrease the charge provided to the battery 214 until the battery is being charged at a minimum charge level if the power received from the one or more power inputs is not greater than the power input threshold. If, at decision block 416*c*, the power received from the one or more power inputs is greater than the power input threshold, the method 400 returns to decision block 416*a*.

If, at decision block 416*b*, it is determined that the charge power is at a minimum level, the method 400 proceeds to decision block 416*e* where it is determined whether operation power is at a minimum level. If at decision block 416*e*, it is determined that the operation power is at a minimum level, the method 400 proceeds to block 416*f* where an insufficient operation power action is performed. In an embodiment, the power utilization engine may include analog circuits to detect and enable a power source. Instructions may be stored on a non-transitory computer-readable medium and, when executed by a processor, may cause the processor to perform the insufficient power action that may include, for example, shutting down one or more of the system components 222, warning the user and shutting down the system, and/or a variety of other insufficient operation power actions known in the art.

If, at decision block 416*e*, it is determined that the operation power is not at a minimum level, the method 400 proceeds to decision block 416*f* where it is determined whether a power input is greater than a power input threshold. As discussed above, the power detect/select engine 210 is operable to compare the power received from the one or more power inputs 202 to the power input power input threshold set in block 406 of the method 400 to determine whether the power currently being received by the IHS 204 is above the power input threshold. If, at decision block 416*f*, it is determined that the power received from the one or more power inputs 202 is not greater than the power input threshold, the method 400 proceeds to block 416*g* where the operation power is decreased. In an embodiment, the component power control engine 216 may include analog circuits to detect and enable a power source. Instructions may be stored on a non-transitory computer-readable medium and, when executed by a processor, may cause the processor to cause the power provided from the one or more power inputs 202 to the system components to decrease. The method 400 then returns to decision block 416e. If, at decision block 416f, it is determined that the power received from the one or more power inputs 202 is greater than the power input threshold, the method 400 returns to decision block 416a.

Thus, a power utilization system and method have been described that characterize power provided by one or more power inputs, use that power characterization to characterize the operation of a plurality of components, and then operate the components according to the power input and the operation characterization. In an embodiment, the operation characterization may include a charging of a battery. The power utilization system may then monitor the power received from the one or more power inputs and increase the operation of the components (up to a maximum operation level) when the received power is sufficient, decrease the operation of the components (down to the minimum level) when the received power decreases, and stop operation of the components with the received power is insufficient. Furthermore, this component control may include providing a charge to a battery when the other components in the system are operating at a maximum operation level, increasing the charge level to the battery when the received power is sufficient, and decreasing the charge level to the battery when the received power decreases. The power utilization engine allows the use of a plurality of power inputs that may each provide power that has different power characteristics relative to the other power inputs, and that may provide power that varies in amount, quality, etc., thus providing for the variable operation of the components and the charging of the battery based on the power that is actually being provided to the system at any given time.

Figure 5:
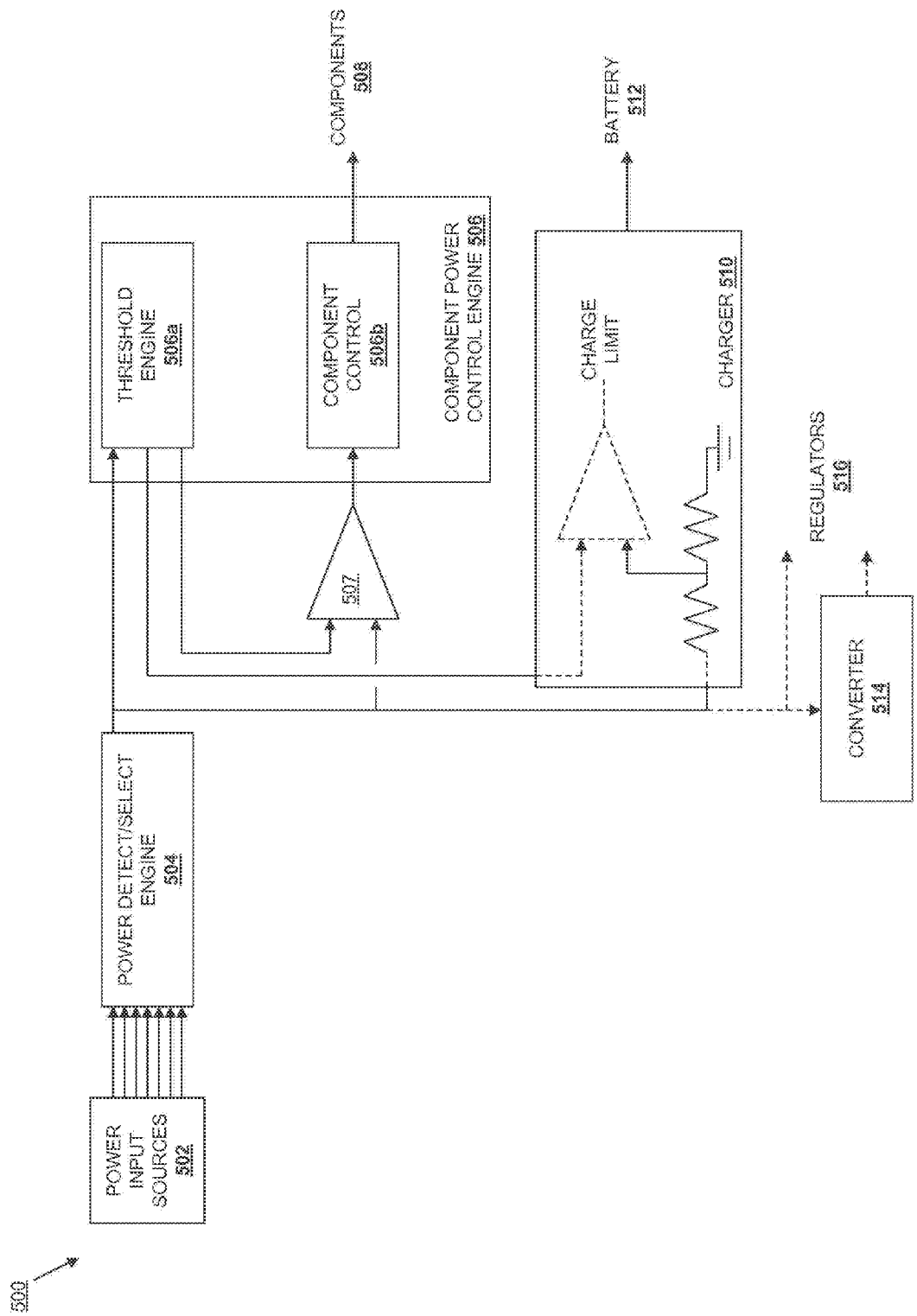
FIG. 5 is a schematic view illustrating an embodiment of a power utilization system.

Referring now to FIG. 5, a power utilization system 500 is illustrated. In an embodiment, the power utilization system 500 is an analog embodiment of a power utilization system that operates according to the method 400 discussed above. The power utilization system 500 includes a plurality of power input sources 502 that may be the power inputs 202a-e discussed above. A power detect/select engine 504 is coupled to the power input sources 502. In an embodiment, the power detect/select engine 504 detects active inputs and selects a voltage for operation. For example, the voltages from the power input sources 502 may be passed through a diode, and the highest of those voltages may be used to clamp off the other voltages. In another example, the highest voltage may be used to power selection circuitry that is operable to shut off all of the input power sources but the preferred source. A component power control engine 506 is coupled to the power detect/select engine 504 and includes a threshold engine 506a and a component control 506b. In an embodiment, the threshold engine 506a may regulate the selected input voltage from the power detect/select engine 504 and use it to power a reference generation circuit that provides fixed reference voltages for both battery charging and component operation. For example, a summing circuit may be used that receives a zero for all references from non-active power input sources 502. In an embodiment, the threshold engine 506a may incorporate feedback from actual battery charge and component operation power usage. In an embodiment, the component control 506b may send an interrupt to the processor (e.g., one of the components 508) to increase or decrease its current performance level. In a relatively simple embodiment, the component control 506b, based on an input from a comparator 507, may use an edge detector and an analog to digital (A-D) converter to change an operation level of the processor. A charger 510 is coupled to the power detect/select engine 504 and the threshold engine 506a, and may be used to detect poor power quality as well as the condition of a battery 512 using charge control circuitry. In an embodiment, the charger 510 may control current limit using the difference in the reference voltage and the supply voltage. In some embodiments, a voltage converter 514 is coupled to regulators 516 and to the power detect/select engine 504.

Figure 6:
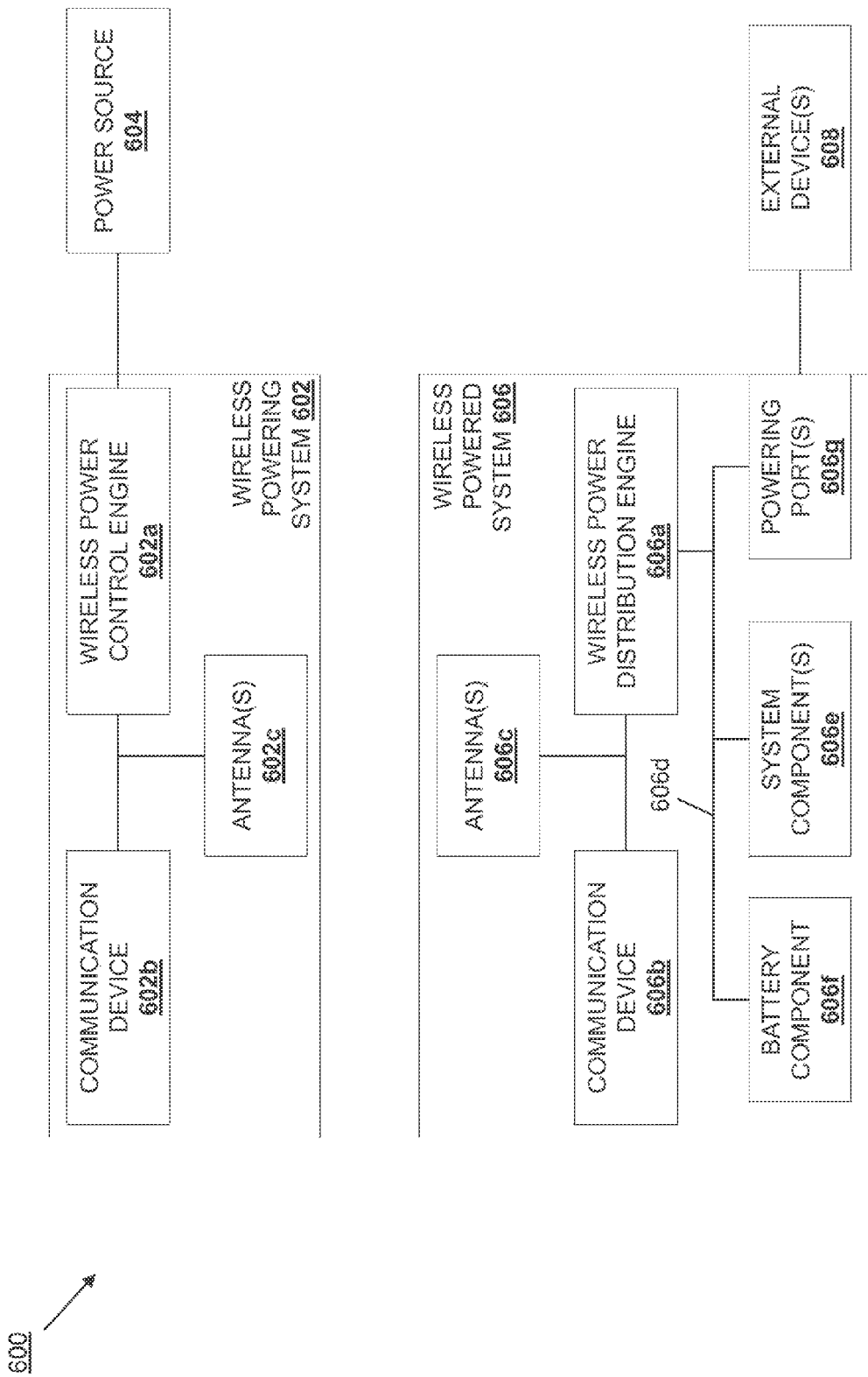
FIG. 6 is a schematic view illustrating an embodiment of a dynamic power distribution system.

Referring now to FIG. 6, an embodiment of a dynamic power distribution system 600 is illustrated. The embodiment of the dynamic power distribution system 600 illustrated and discussed below is directed to the distribution of dynamic power provided by a wireless powering system 602 to the wireless powered system 606. However, one of skill in the art in possession of the present disclosure will recognize that the teachings herein may be applied to a wide variety of other changing, variable, or otherwise dynamic power sources known in the art, and thus will fall within the scope of the present disclosure. In some embodiments, the wireless powering system 602 may be the IHS 100 discussed above with reference to FIG. 1 and/or may include some or all of the components of the IHS 100. The wireless powering system 602 may provide a direct induction wireless powering system, an electromagnetic radiation wireless powering system, an electrical conduction wireless powering system, and/or a variety of other wireless powering systems known in the art. The wireless powering system 602 may include a processing system (e.g., the processor 102 discussed above with reference to FIG. 1) and a memory system (e.g., the system memory 114 discussed above with reference to FIG. 1) that includes instructions that, when executed by the processing system, cause the processing system to provide a wireless power control engine 602a that provides the functionality of the wireless power control engines and/or wireless powering systems discussed below. In an embodiment, the wireless powering system 602 may include other hardware components and/or software components that provide one or more wireless power provisioning modules utilized in the wireless powering system such as, for example, a wireless power supply unit, a source to load limit controller, a throttle controller, and/or a variety of other wireless powering system hardware and/or software components known in the art.

The wireless powering system 602 also includes a communication device 602b that may be, for example, a Near Field Communication (NFC) device, a Bluetooth communication device, a Bluetooth Low Energy (BLE) communication device, a Wi-Fi Direct communication device, and/or a variety of other communication devices known in the art. Each of the communication device 602b and the wireless power control engine 602a may be coupled to one or more antennas 602c (e.g., by a bus connecting the antenna to the processing system that provides the wireless power control engine 602a) that are configured to transmit data and/or power to the wireless powered system 606. The wireless powering system 602 includes features such as, for example, cabling and/or other power couplings known in the art, that are configured to couple the wireless power control engine 602a to a power source 604 such as, for example, a direct current (DC) source that may include power adapters, an alternating current (AC) to DC power source, a Universal Serial Bus (USB) power source, an automobile power source, an airplane power source, and/or a variety of other power sources known in the art.

In some embodiments, the wireless powered system 606 may be the IHS 100 discussed above with reference to FIG. 1 and/or may include some or all of the components of the IHS 100. The wireless powered system 606 may provide a direct induction wireless powered system, an electromagnetic radiation wireless powered system, an electrical conduction wireless powered system, and/or a variety of other wireless powered systems known in the art. The wireless powered system 606 may include a processing system (e.g., the processor 102 discussed above with reference to FIG. 1) and a memory system (e.g., the system memory 114 discussed above with reference to FIG. 1) that includes instructions that, when executed by the processing system, cause the processing system to provide a wireless power distribution engine 606a that provides the functionality of the wireless power distribution engines and/or wireless powered systems discussed below. In an embodiment, the wireless powered system 606 may include other hardware components and/or software components that provide one or more wireless power receiving modules utilized in wireless powered system such as, for example, a wireless charger client, power regulators, a host/embedded controller (EC) throttle controller, and/or a variety of other wireless powered system hardware and/or software components known in the art.

The wireless powered system 606 also includes a communication device 606b that may be, for example, a Near Field Communication (NFC) device, a Bluetooth communication device, a Bluetooth Low Energy (BLE) communication device, a Wi-Fi Direct communication device, and/or a variety of other communication devices known in the art. Each of the communication device 606b and the wireless power distribution engine 606a may be coupled to one or more antennas 606c (e.g., by a bus connecting the antenna to the processing system that provides the wireless power distribution engine 606a) that are configured to transmit data and/or receive power from the wireless powering system 602. The wireless powered system 606 includes one or more buses 606d that are coupled to the wireless power distribution engine 606a (e.g., to the processing system that provides the wireless power distribution engine 606a) and to systems components 606e that may include a battery component 606f, and one or more powering ports 606g. In some embodiments, the system components 606e may be any or all of the components of the IHS 100 discussed above with reference to FIG. 1, while in other embodiments, the system components 606e may be any components in a wireless powered system that provide the functionality of that wireless powered system. In different embodiments, the powering port(s) 606g may include USB powering ports, DC powering ports, High Definition Multimedia Interface (HDMI) powering ports, Ethernet powering ports, and/or a variety of other powering ports known in the art. The wireless powered system 606 may include features such as, for example, cabling and/or other power couplings known in the art, that are configured to couple the powering port(s) 606g to external device(s) 608 such as, for example, mobile phone IHSs, IHS peripheral devices, and/or a variety of other external devices known in the art.

The wireless power distribution engine 606a (e.g., the memory system that provides the wireless power distribution engine 606a or a database coupled to the wireless power distribution engine 606a) may store or otherwise have access to one or more power distribution rules. In some embodiments, power distribution rules may be provided in the wireless powered system 606 by a wireless powered system manufacturer. In some embodiments, power distribution rules may be provided in the wireless powered system 606 by a user of the wireless powered system 606 using, for example, an input device such that the input device 106 discussed above with reference to FIG. 1. As discussed in further detail below, power distribution rules may include definitions, instructions, and/or other information that instructs the wireless power distribution engine 606a how to allocate power received from the wireless powering system 602. In some embodiments, the power received from the wireless powering system 602 is variable, changing, or otherwise a dynamic power that may not be sufficient to provide adequate power amounts needed, requested, or otherwise utilized by each of the system component(s) 606e, the battery component 606f, and the external device(s) 608 in their operation. As such, power distribution rules may instruct the wireless distribution engine 606a how to allocate dynamic power amounts received from the wireless powering system 602 to any (or any combination of) the system component(s) 606e, battery component 606f, and the powering port(s) 606g (such that power is provided from the powering port(s) 606g to the external device(s) 608). In some embodiments, power distribution rules may be provided prior to the performance of the method 800, discussed below, such that the wireless powered system 606 stores a plurality of power distribution rules. In some embodiments, power distribution rules may be provided during the method 800 such that a user may define how a power budget is allocated and distributed "on-the-fly", following, or otherwise in response to determining a power budget from a dynamic or limited power amount.

For example, a power distribution rule included in or accessible by the wireless power distribution engine 606a may include instructions to the wireless power distribution engine 606a to allocate dynamic power received from the wireless powering system 602 in a first power amount to the battery component 606f if the charge of the battery component 606f is below a predetermined level, along with which system component(s) 606 and/or external device(s) 608 (e.g., through the powering port(s) 606g) to allocate any remaining power amount to. As such, power distribution rules may include a system component/external device hierarchy that defines the priority of power provision from a dynamic power received from the wireless powering system 602 to the system component(s) 606e and/or external device(s) 608. In an embodiment, a system component/external device hierarchy in a power distribution rule may specify particular system component(s) 606e that should be provided available power before particular external device(s) 608, as well as particular external device(s) 608 that should be provided available power before particular system component(s) 606e. For example, a manufacturer of a wireless powered system 606 may provide a system component/external device hierarchy in a power distribution rule that specifies that core IHS system components (e.g., a processing system and a memory system in an IHS) should be provided available power before any other system components 606e or external devices 608. In another example, a user of a wireless powered system 606 may provide a system component/external device hierarchy in a power distribution rule that specifies that particular external devices 608 (e.g., a mobile phone IHS (external device) coupled to a wireless powered IHS by a USB cable) should be provided available power before any other system components 606e or external devices 608.

In another embodiment, power distribution rules may specify how system components and/or external devices are to be powered based on the running state of the IHS (e.g., full power state, intermediate power state, reduced power state, etc.). In another embodiment, power distribution rules may specify how power should be provided based on a charge level of the battery to be used to charge as well as the battery to be charged, the types of batteries charging and charged, and/or any other characteristics of the batteries or power sources used in the system. In another embodiment, power distribution rules may specify how power is distributed based on user actions with regard to an IHS (e.g., use characteristics, user profiles, etc.) For example, a user action may require an IHS to perform a particular action that requires an amount of power, and the power distribution rules may specify how power should be allocated based on the need to perform that particular action. In another embodiment, power distribution rules may specify how power is distributed based on thermal characteristics of the IHSs being used in the system. While a few examples have been provided, one of skill in the art in possession of the present disclosure will recognize that any of a variety of definitions, instructions, and/or other information may be provided in one or more power distribution rules to instruct the wireless power distribution engine 606a how to distribute dynamic power from the wireless powering system 602.

Figure 7:
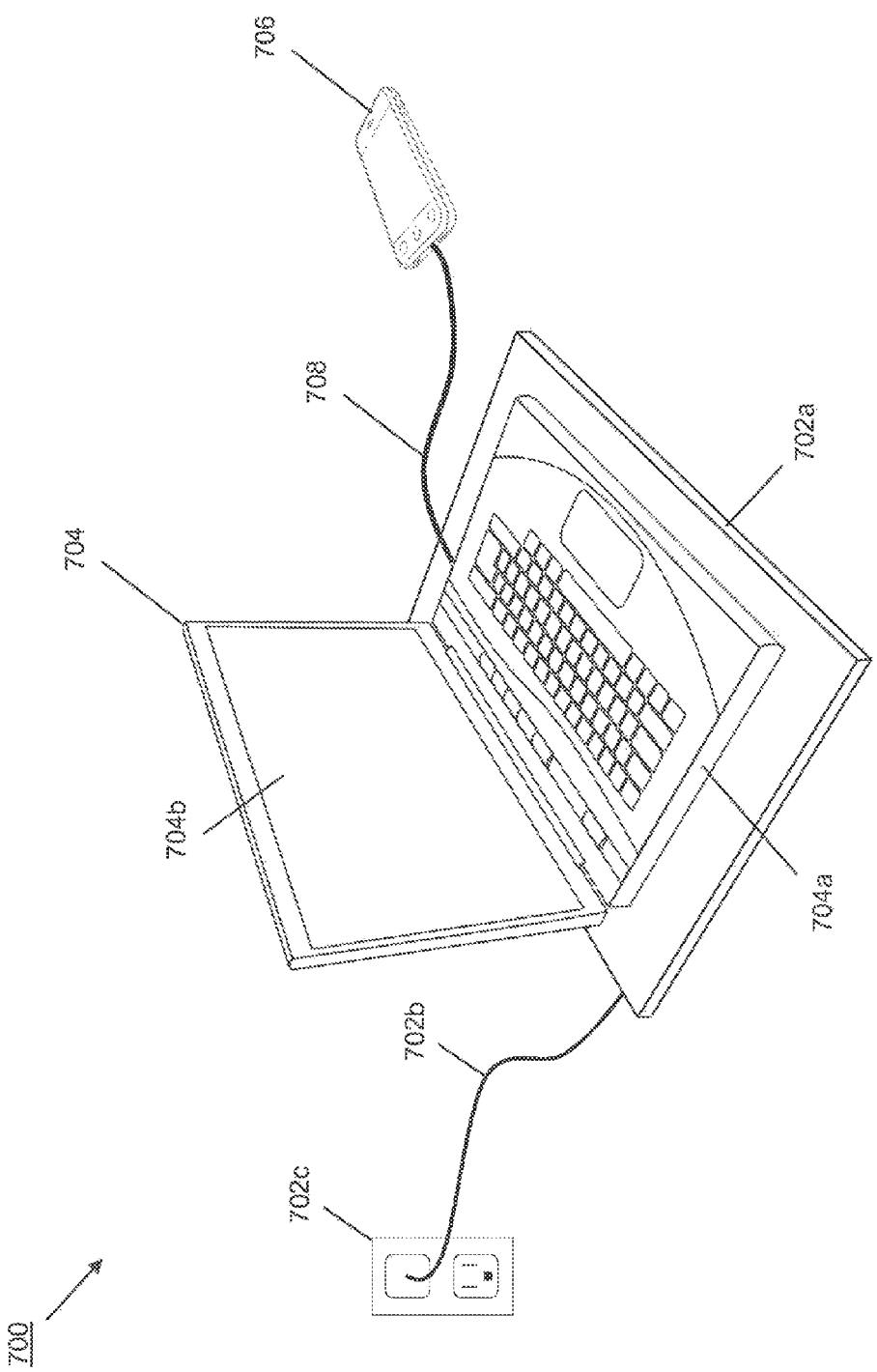
FIG. 7 is a perspective view illustrating an embodiment of a dynamic power distribution system

Referring now to FIG. 7, a specific embodiment of a dynamic power distribution system 700 is illustrated that may be the dynamic power distribution system 600 of FIG. 6 and/or include some or all of the components of the dynamic power distribution system 600. In the illustrated embodiment, the dynamic power distribution system 700 includes a wireless powering system that includes a wireless powering pad 702a and a power cord 702b that extends from the wireless powering pad 702a and couples to a wall plug 702c that is configured to provide power from a power source. In an embodiment, the wireless powering pad 702a may house the components of the wireless powering system 602 discussed above with reference to FIG. 6. The dynamic power distribution system 700 also includes a powered laptop/notebook IHS 704 having a base 704a moveably coupled to a display 704b. In an embodiment, the base 704a of the powered laptop/notebook IHS 704 may house the components of the wireless powered system 606 discussed above with reference to FIG. 6. The dynamic power distribution system 700 also includes a mobile phone IHS 706 that may be the external device 608 discussed above with reference to FIG. 6, and that is coupled to the powered laptop/notebook IHS 704 by a USB cable 708 or other powering cable known in the art. As is known in the art of wireless powering systems, the powered laptop/notebook IHS 704 may be placed on or adjacent the wireless powering pad 702a, as illustrated in FIG. 7, to receive wireless power transmitted by the wireless powering system without the need to connect power cables between the wireless powering pad 702a and the laptop/notebook IHS 702.

Figure 8:
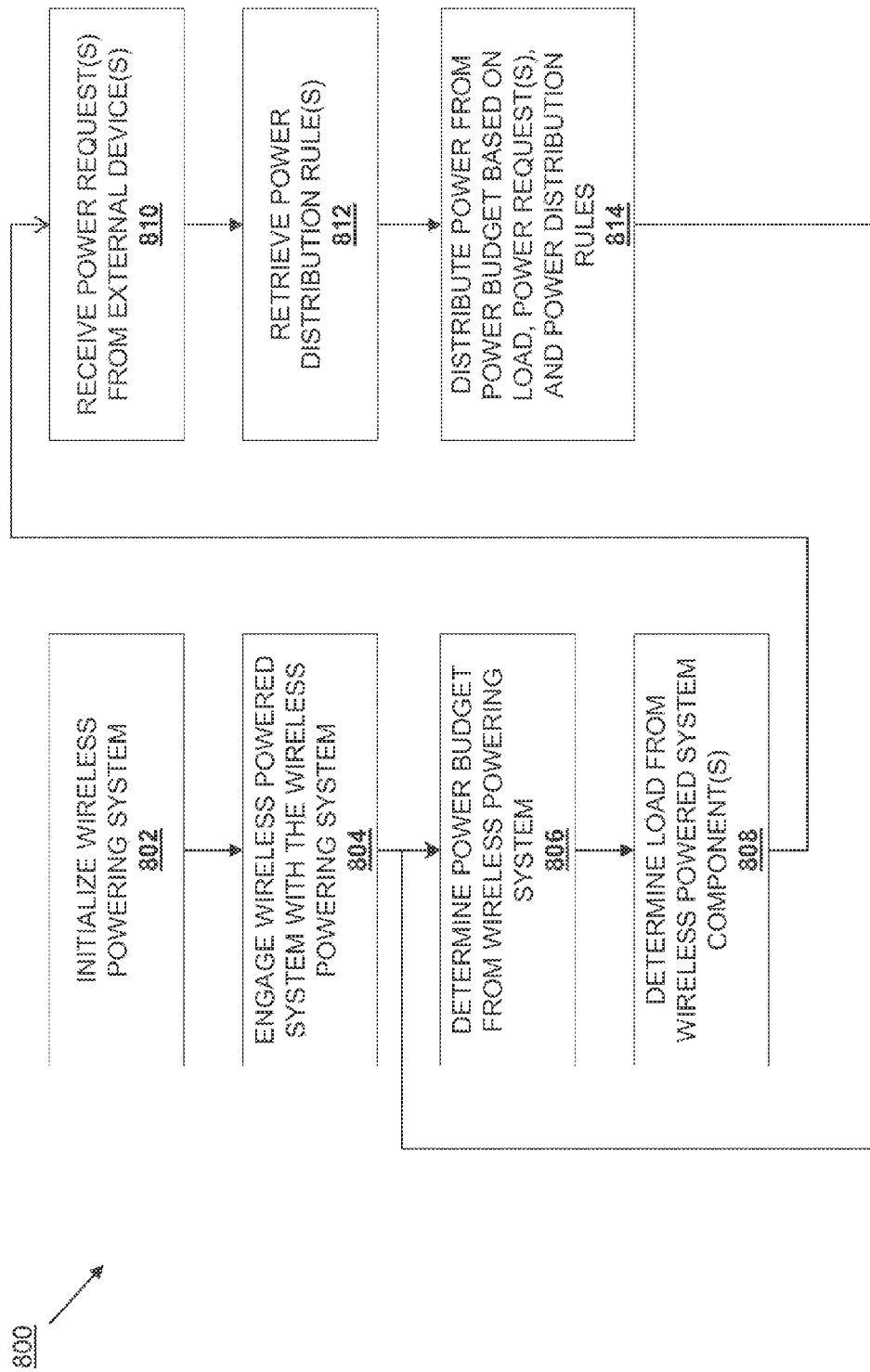
FIG. 8 is a flow chart illustrating an embodiment of a method for distributing dynamic power

Referring now to FIGS. 6, 7, and 8, a method 800 for distributing power is illustrated. The method 800 is illustrated and described below as providing for the distribution of a dynamic power from a wireless powering system to system component(s) and/or external device(s) in a wireless powered system. However, as discussed above, one of skill in the art will recognize that the teachings of the present disclosure may be applied to any of a variety of dynamic power situations in which the power provided by a dynamic powering system is variable, changing, or otherwise dynamic, and thus the application of the teachings of the present disclosure to dynamic power received from a dynamic powering system other than wireless powering systems are envisioned as falling within the scope of the present disclosure.

The method 800 begins at block 802 where the wireless powering system is initialized. In an embodiment, the wireless power control engine 602a and/or other subsystems in the wireless powering system 602 may operate at block 802 to initialize the wireless powering system in response to connection of the wireless powering system 602 to the power source 604, powering on of the wireless powering system, and/or a variety of other initialization events known in the art. The method 800 then proceeds to block 804 where the wireless powered system is engaged with the wireless powering system. In an embodiment, the wireless powered system 606 is positioned on, adjacent to, or otherwise within a minimum wireless powering distance from the wireless powering system 602 in order to engage the wireless powering system 602 and the wireless powered system 606. For example, FIG. 7 illustrates how the powered laptop/notebook IHS 704 may be positioned on the wireless powering pad 702a to engage the powered laptop/notebook IHS 704 and the wireless powering system at block 804 of the method 800. While a few examples have been illustrated and described, the engagement of the wireless powered system 606 and the wireless powering system 602 may be accomplished in a variety of manners known in the art of wireless power systems.

The initialization of the wireless powering system 602 at block 802 and the engagement of the wireless powered system 606 with the wireless powering system 602 at block 804 may include the performance of a variety of wireless power system functionality known in the art by the wireless powering system 602 and the wireless powered system 606. For example, the wireless powering system 602 may perform initialization operations at block 802 such as, for example, powering on, foreign object detection, loading of the wireless charging standard to be used, and/or a variety of other initialization operations known in the art. In another example, the wireless powering system 602 may perform engagement operations at block 804 such as, for example, discovery of the wireless powered system 606, exchange of identifications with the wireless powered system 606, exchange of capabilities with the wireless powered system 606, exchange of status with the wireless powered system 606, and/or a variety of other engagement operations known in the art. In another example, the wireless powered system 606 may perform engagement operations at block 804 such as, for example, discovery of the wireless powering system 602, exchange of identifications with the wireless powering system 602, exchange of capabilities with the wireless powering system 602, exchange of status with the wireless powering system 602, and/or a variety of other engagement operations known in the art. As is known in the art, these initialization operations and engagement operations may provide for an initial supply of a default wireless power amount from the wireless powering system 602 to the wireless powered system 606, a determination that a compatible wireless powered system has engaged the wireless powering system 602, and/or a variety of other initialization and engagement purposes known in the art.

In an embodiment, the engagement of the wireless powered system 606 with the wireless powering system 602 at block 804 may include an information exchange between then communication device 202b in the wireless powering system 602 and the communication device 206b in the wireless powered system 606. For example, the wireless powering system 602 may communicate powering system information to the wireless powered system 606 such as, for example, wireless powering system control information, a wireless powering system electronic identification (EID), wireless powering system status information, wireless powering system health information, wireless powering system security information, wireless powering system thermal information, and/or a variety of other powering system information known in the art. In another example, the wireless powered system 606 may communicate powered system information to the wireless powering system 602 such as, for example, wireless powered system control information, a wireless powered system electronic identification (EID), wireless powered system status information, wireless powered system health information, wireless powered system security information, wireless powered system thermal information, and/or a variety of other powered system information known in the art.

The method 800 then proceeds to block 806 where a power budget from the wireless powering system is determined. In an embodiment, the wireless power distribution engine 606a in the wireless powered system 606 operates at block 806 to determine a power budget from the power received (e.g., via the antenna(s) 606c) from the wireless powered system 602. In an embodiment, in response to the engagement of the wireless powered system 606 with the wireless powering system 602, the wireless power control engine 602a operates to transmit wireless power from the power source 604 and through the antenna(s) 602c to the wireless powered system 606. In response, the wireless power distribution engine 606a in the wireless powered system 606 may detect a power provided by the wireless powering system 602 that is variable, changing, or otherwise dynamic based upon, for example, the power supplied from the power source 604, the operations associated with wirelessly supplying power, relative movement of the charging and charged device, other misalignment of the charging coils, thermal issues with the charging coils, and/or a variety of other dynamic power supply causes known in the art. The wireless power distribution engine 606a may then determine a power budget that is based upon the dynamic power being provided by the wireless powering system 602. The power budget based upon that dynamic power may include a minimum power amount being supplied via the dynamic power (e.g., the lowest power amount supplied during the supplying of the dynamic power for a predetermined time period), an average power amount being supplied via the dynamic power (e.g., the average power amount supplied during the supplying of the dynamic power for a predetermined time period), and/or using a variety of other characteristics of the dynamic power that would be apparent to one of skill in the art in possession of the present disclosure. As such, following block 806, the wireless powered system 606 has determined a power budget that include an amount of dynamic power currently being provided by the wireless powering system 602, and as discussed below, the wireless powered system 606 may continually monitor the dynamic power being provided by the wireless powering system 602 during the method 800 to re-determine the power budget as that dynamic power changes (or changes more than a predetermined amount).

The method 800 then proceeds to block 808 where a load is determined from wireless powered system components. In an embodiment, the wireless power distribution engine 606a operates at block 808 to determine a load required for at least some level of operation of each of the system component(s) 606e in the wireless powered system 606 including the battery component 606f. For example, the wireless power distribution engine 606a may reference a database that includes the amount of power consumed by each of the system component(s) 606e during their operation and the battery component 606f during charging (which may vary based on the battery charge level) in order to determine the load required by each of the system component(s) 606e and the battery component 606f during their operation. In another example, the wireless power distribution engine 606a may monitor power regulators that are coupled to each of the system component(s) 606e and/or the battery component 606f in order to determine the load required by each of the system component(s) 606e and the battery component 606f during their operation. While a few examples have been provided, one of skill in the art in possession of the present disclosure will recognize that a wide variety of techniques may be used by the wireless power distribution engine 606a to determine a load required by (or being used by) any or all of the system components 606e including the battery component 606f while remaining within the scope of the present disclosure. As such, following block 808, the wireless powered system 606 has determined the amounts of power needed to power each (or any combination of) the subsystem components 606e and the battery component 606f in the wireless powered system 606 at one or more operation levels.

The method 800 then proceeds to block 810 where power requests are received from one or more external device(s). In an embodiment, the wireless power distribution engine 606a operates at block 810 to receive power requests from external device(s) that are connected to the powering port(s) 606g. For example, the wireless power distribution engine 606a may monitor each of the powering port(s) 606g to determine whether a power request has been received from an external device 608 connected to that powering port 608. While an example has been provided, one of skill in the art in possession of the present disclosure will recognize that a wide variety of techniques may be used by the wireless power distribution engine 606a to receive power requests from connected external devices while remaining within the scope of the present disclosure. As such, following block 810, the wireless powered system 606 has determined the amounts of power needed to power each (or any combination of) the external device(s) 608 connected to the powering port(s) 608 in the wireless powered system 606 at one or more levels of operation of those external device(s).

The method 800 then proceeds to block 812 where power distribution rule(s) are retrieved. In an embodiment, the wireless power distribution engine 606a operates at block 812 to retrieve one or more power distribution rule(s) that are included in or otherwise accessible by the wireless power distribution engine 606a. As discussed above, the power distribution rule(s) may include definitions, instructions, and/or other information that instructs the wireless power distribution engine 606a how to allocate power received from the wireless powering system 602. In an embodiment, the power distribution rule(s) retrieved at block 812 may be retrieved based on the power budget determined at block 606, the load determined at block 808, the power request(s) received block 810, and/or a variety of other power distribution factors that would be apparently to one of skill in the art in possession of the present disclosure. For example, the power budget determined at block 806 may indicate a particular power amount that is available from the dynamic power currently being received from the wireless powering system 602, and that particular power amount may be used to retrieve power distribution rule(s) associated with that particular power amount (e.g., power distribution rules that instruct the wireless power distribution engine 606a how to allocate power received from the wireless powering system 602 that is equal to or less than that particular power amount).

In another example, the load determined at block 808 may indicate particular power amounts needed by each subsystem component 706e and the battery component 606f from the dynamic power received from the wireless powering system 602, and those particular power amounts may be used to retrieve power distribution rule(s) associated with those particular power amounts (e.g., power distribution rules that instruct the wireless power distribution engine 606a how to allocate power received from the wireless powering system 602 that is equal to or less than those particular power amounts). In another example, the load determined at block 808 may indicate particular system components that need the dynamic power received from the wireless powering system 602, and those particular system components may be used to retrieve power distribution rule(s) associated with those particular system components (e.g., power distribution rules that instruct the wireless power distribution engine 606a how to allocate power received from the wireless powering system 602 to those particular system components).

In another example, the power request(s) received at block 810 may indicate particular power amounts needed by the external device(s) from the dynamic power received from the wireless powering system 602, and those particular power amounts may be used to retrieve power distribution rule(s) associated with those particular power amounts (e.g., power distribution rules that instruct the wireless power distribution engine 606a how to allocate power received from the wireless powering system 602 that is equal to or less than those particular power amounts). In another example, the power request(s) received at block 810 may indicate particular external device(s) that need the dynamic power received from the wireless powering system 602, and those particular external device(s) may be used to retrieve power distribution rule(s) associated with those particular external device(s) (e.g., power distribution rules that instruct the wireless power distribution engine 606a how to allocate power received from the wireless powering system 602 to those particular external device(s)). While a few examples have been provided, one of skill in the art in possession of the present disclosure will recognize that a variety of information may be used to filter, prioritize, and/or otherwise retrieve power distribution rule(s) based on the power budget, load, power requests, and/or other wireless powered system factors while remaining within the scope of the present disclosure.

In some embodiments, the power distribution rule(s) may be provided by a user and retrieved by the wireless power distribution engine 606a subsequent to engagement of the wireless powered system 606 with the wireless powering system 602 at block 804 and/or the determination of the power budget at block 806. For example, the wireless power distribution engine 606a may determine the power budget at block 806, report that power budget (which may include a limited power amount that is not sufficient to power all of the system component(s) 606e and/or external device(s) 608 in the wireless powered system 606) to the user (e.g., via a display device such as the display 110 discussed above with reference to FIG. 1). A user receiving the report of the power budget may then be able to provide (e.g., via a power distribution application executing on the wireless powered system 606) information about system component(s) 606e, external device(s) 608, a desired functionality for the wireless powered system 606 (e.g., that may require system component(s) 606e and/or external device(s) 608), and/or other information that provides power distribution rule(s) that instruct the wireless power distribution engine 606a how to allocate and distribute that limited power amount to the system component(s) 606e and/or external device(s) 608. For example, referring to FIG. 7, the user may engage the powered laptop/notebook IHS 704 with the wireless powering pad 702a and connect (or have previously connected) the mobile phone IHS 706 to the powered laptop/notebook IHS 704, and upon detecting a limited dynamic power available from the wireless powering pad 702a, the wireless power distribution engine 606a may provide a power distribution rule screen on the display 704b that allows the user to provide power distribution rule(s) to instruct the wireless power distribution engine 606a how to distribute that limited dynamic power. As such, a user that wishes to charge the mobile phone IHS 706 as quickly as possible may provide power distribution rule(s) that instruct the wireless power distribution engine 606a to allocate as much of the power budget as possible (e.g., up to a maximum amount) to the powering port connected to the mobile phone IHS 706 (while allocating excess power, if available, to other system component(s) and/or external device(s) 608).

In some embodiments, the wireless power distribution engine 606a may operate, prior to distributing power from the power budget determined at block 806, to ensure that the wireless powered system 606 is stable enough to distribute power from the power budget to the system component(s) 606e and/or the external device(s) 608. Similarly as discussed above, prior to distributing power from the power budget, the wireless power distribution engine 606a may determine whether the battery component 606f includes a charge level that is below a predetermined level that is required to provide stable power the wireless powered system 606 for boot operations, wireless powered system control, power provisioning to the powering port(s) 606g, and/or other stability considerations known in the art. If the charge level of the battery component 606f is below the predetermined level, the power budget may be allocated and distributed to the battery component 606f (e.g., in its entirety, in a maximum amount allowable by the battery component 606f, etc.) in order to charge the battery component 606f to a charge level that is above the predetermined level.

Thus, the wireless power distribution engine 606a may provide at least some portion of the power budget to the battery component 606f until the battery component 606f is charged to a minimum charge level that allows the wireless powered system 606 to operate at a minimum functionality level that allows the power budget to be allocated and distributed to other system components 606e and/or external device(s) 608. In some embodiments, subsequent to charging the battery component 606f to the minimum charge level, one or more power distribution rule(s) may instruct the wireless power distribution engine 606a to allocate some minimum power amount from the power budget to the battery component 606f until the battery component 606f reaches an intermediate charge level (or maximum charge level), while allocating other power amounts from the power budget to the system components 606e and/or external device(s) 608, discussed below. However, in some embodiments, power distribution rules may instruct the wireless powered system 606 to allocate and distribute power to a powering port 606g (e.g., connected to a mobile phone IHS or other high priority external device) even when the battery component is "dead" or has a very low or no charge level.

The method 800 then proceeds to block 814 where power is distributed from the power budget based on the load, the power request(s), and the power distribution rule(s). In an embodiment, the wireless power distribution engine 606a uses the power distribution rule(s) retrieved at block 812 to determine how to provide power from the power budget that was determined at block 806 to the system components 606*e* including the battery component 606*f* (e.g., based on the loads determined at block 808) and/or to the external device(s) 608 (e.g., based on the power request(s) received at block 810). While not discussed explicitly below, in some embodiments power distribution rule(s) may instruct the wireless power distribution engine 606*a* to allocate a power amount necessary for the operation of the components that provide the wireless power distribution engine 606*a*, the communication device 606*b*, and/or other components necessary to perform one or more of the blocks of the method 800.

In one embodiment, the power distribution rule(s) may instruct the wireless power distribution engine 606*a* to allocate a maximum power amount permitted by an external device to the powering port 606*g* that is connected to that external device 608, followed by allocating the remaining power to a hierarchy or prioritization of system components 606*e* and/or other external device(s) 608 connected to powering ports 606*g*. For example, referring to FIG. 7, a user may prioritize the charging of the battery in their mobile phone IHS 706 relative to utilizing functionality in their powered laptop/notebook IHS 704, and thus may provide power distribution rule(s) that instructs the wireless power distribution engine 606*a* to allocate a maximum power amount permitted by the mobile phone IHS 706 to the powering port that is connected to it upon determining that the power budget is sufficient to provide that maximum power amount and receiving a power request from the mobile phone IHS 706. Furthermore, if the power budget provides more power than maximum power amount permitted by the mobile phone IHS 706, the power distribution rule(s) may instruct the wireless power distribution engine 606*a* to allocate the remaining power first to the processing system, the memory system, and the display in the powered laptop/notebook IHS 704, next to the wireless communication systems in the powered laptop/notebook IHS 704, and so on.

In some embodiments, the wireless powered system 606 may operate to detect a requested increase in operation level and, in response, determine whether additional power is needed. If additional power is needed, the wireless powered system 606 may request more power from the wireless powering system 602. For example, the wireless power distribution engine 606*a* may use the communication device 606*b* and antenna(s) 606*c* to send a request for additional power to the wireless power control engine 602*a* (e.g., through the communication device 602*b* and the antenna(s) 602*c*). In response, the wireless power control engine 602*a* may receive the request from the wireless powered system 606, determine whether excess power may be provided to the wireless powered system 606 (e.g., whether the current power being provided is below a maximum amount of power the wireless powering system 602 is capable of providing) and, if so, increase its operating level to provide more wireless power to the wireless powered device 606.

In some embodiments, the wireless powered system 606 may operate to detect a requested decrease in operation level and, in response, determine whether some of the power being provided by the wireless powering system 602 is not needed. If the wireless powered system 606 determines that some of the power being provided by the wireless powering system 602 is not needed, the wireless powered system 606 may request less power from the wireless powering system 602. For example, the wireless power distribution engine 206*a* may use the communication device 606*b* and antenna(s) 606*c* to send a request for decreased power to the wireless power control engine 602*a* (e.g., through the communication device 602*b* and the antenna(s) 602*c*). In response, the wireless power control engine 602*a* may receive the request from the wireless powered system 606, determine whether less power may be provided to the wireless powered system 606 (e.g., whether the current power being provided is above a minimum amount of power the wireless powering system 602 is capable of providing) and, if so, decrease its operating level to provide less wireless power to the wireless powered device 606.

The method 814 then proceeds back to block 806 to determine the power budget from the wireless powering system substantially as discussed above. As such, the wireless powered system 602 may operate to continually monitor the dynamic power provided by the wireless powering system 606 to determine a power budget (that may periodically or continuously change over time) and allocate and distribute that power budget to the system component(s) 606*e*, the battery component 606*f*, and/or the external device(s) 608 based on the load from the system component(s) 606*e* and the battery component 606*f*, the power request(s) from the external devices 608, and the power distribution rule(s) that instruct the wireless powered device 606 how a limited power budget based on a dynamically supplied power should be distributed between those system component(s) 606*e*, the battery component 606*f*, and/or the external device(s) 608. Furthermore, the load form the system component(s) 606*e* may change (e.g., based on different operating levels and/or instructions from a user), the load from the battery component 606*f* may change (e.g., based on a changing charge level due to battery use or battery charging), and the power requests from the external device(s) may change, and the wireless powered system 602 may periodically or continuously monitor those loads and power requests to adjust which system component(s) and external device(s) are provided power from the power budget. As such, as external device(s) are connected and disconnected from the wireless powered system 606, power may be provided (and different power levels (e.g., different current levels)) may be provided for different periods of time depending on the power distribution rules.

Thus, systems and methods have been described that provide for a powered system that receives dynamic power from a dynamic power provisioning system to allocate that dynamic power to system components and/or external devices based on power distribution rules such that higher priority system components and/or external devices may be provided power over lower priority system components and/or external devices when the dynamic power provides a limited power amount that is not sufficient to power all of the system components and external devices. As such, a user, IHS manufacturer, or other entity may define how power amounts, system components, and external devices are powered in different situations to ensure that a limited power amount provided to the powered system is utilized in the most desired and efficient manner.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power distribution system, comprising:
   an external device; and
   a powered system that is coupled to the external device through a Universal Serial Bus (USB) connection, wherein the powered system is configured to:
   receive power from a power source;
   determine a powered system load for the powered system;
   receive a first power request from the external device through the USB connection;
   identify at least one power distribution rule;
   allocate and distribute a first power amount from the power received from the power source to the external device through the USB connection using the powered system load, the first power request, and the at least one power distribution rule;
   receive, subsequent to receiving the first power request, a second power request from the external device through the USB connection; and
   allocate and distribute a second power amount from the power received from the power source to the external device through the USB connection using the powered system load, the second power request, and the at least one power distribution rule, wherein the second power amount is different than the first power amount.

2. The power distribution system of claim 1, wherein the powered system is configured to:
   determine a power budget using the power received from the power source;
   wherein the first power amount is allocated and distributed from the power received from the power source to the external device through the USB connection using the power budget; and
   wherein the second power amount is allocated and distributed from the power received from the power source to the external device through the USB connection using the power budget.

3. The power distribution system of claim 1, wherein the powered system is configured to:
   determine a first power budget using the power received from the power source, wherein the first power amount is allocated and distributed from the power received from the power source to the external device through the USB connection using the first power budget; and
   determine a second power budget using the power received from the power source, wherein the second power budget is different than the first power budget, and wherein the first power amount is allocated and distributed from the power received from the power source to the external device through the USB connection using the second power budget.

4. The power distribution system of claim 1, wherein the powered system is configured to:
   determine a first powered system load, wherein the first power amount is allocated and distributed from the power received from the power source to the external device through the USB connection using the first powered system load; and
   determine a second powered system load that is different than the first powered system load, wherein the second power amount is allocated and distributed from the power received from the power source to the external device through the USB connection using the second powered system load.

5. The power distribution system of claim 1, wherein the powered system is configured to:
   identify at least one first power distribution rule, wherein the first power amount is allocated and distributed from the power received from the power source to the external device through the USB connection using the at least one first power distribution rule; and
   identify at least one second power distribution rule that is different than the at least one first power distribution rule, wherein the second power amount is allocated and distributed from the power received from the power source to the external device through the USB connection using the at least one power distribution rule.

6. The power distribution system of claim 1, wherein the first power amount expedites charging of a battery in the external device relative to the second power amount.

7. The power distribution system of claim 1, wherein the power received from the power source is a dynamic power that varies over time.

8. An information handling system (IHS), comprising:
   a plurality of system components;
   a Universal Serial Bus (USB) connector;
   a power receiving module;
   a processing system that is coupled to the plurality of system component, the USB connector, and the power receiving module; and
   a memory system that includes instructions that, when executed by the processing system, cause the processing system to provide a power distribution engine that is configure to:
   receive power from a power source through the power receiving module;
   determine a system load for the plurality of system components;
   receive a first power request from an external device through the USB connector;
   identify at least one power distribution rule;
   allocate and distribute a first power amount from the power received from the power source to the external device through the USB connector using the system load, the first power request, and the at least one power distribution rule;
   receive, subsequent to receiving the first power request, a second power request from the external device through the USB connector; and
   allocate and distribute a second power amount from the power received from the power source to the external device through the USB connector using the system load, the second power request, and the at least one power distribution rule, wherein the second power amount is different than the first power amount.

9. The IHS of claim 8, wherein the power distribution engine is configured to:
   determine a power budget using the power received from the power source;
   wherein the first power amount is allocated and distributed from the power received from the power source to the external device through the USB connector using the power budget; and
   wherein the second power amount is allocated and distributed from the power received from the power source to the external device through the USB connector using the power budget.

10. The IHS of claim 8, wherein the power distribution engine is configured to:
    determine a first power budget using the power received from the power source, wherein the first power amount is allocated and distributed from the power received from the power source to the external device through the USB connector using the first power budget; and determine a second power budget using the power received from the power source, wherein the second power budget is different than the first power budget, and wherein the first power amount is allocated and distributed from the power received from the power source to the external device through the USB connector using the second power budget.

11. The IHS of claim 8, wherein the power distribution engine is configured to:

determine a first powered system load, wherein the first power amount is allocated and distributed from the power received from the power source to the external device through the USB connector using the first powered system load; and determine a second powered system load that is different than the first powered system load, wherein the second power amount is allocated and distributed from the power received from the power source to the external device through the USB connector using the second powered system load.

12. The IHS of claim 8, wherein the power distribution engine is configured to:

identify at least one first power distribution rule, wherein the first power amount is allocated and distributed from the power received from the power source to the external device through the USB connector using the at least one first power distribution rule; and identify at least one second power distribution rule that is different than the at least one first power distribution rule, wherein the second power amount is allocated and distributed from the power received from the power source to the external device through the USB connector using the at least one power distribution rule.

13. The IHS of claim 8, wherein the first power amount expedites charging of a battery in the external device relative to the second power amount.

14. The IHS of claim 8, wherein the power received from the power source is a dynamic power that varies over time.

15. A method for distributing power, comprising:

receiving, by a powered system, power from a power source;

determining, by the powered system, a powered system load for the powered system;

receiving, by the powered system, a first power request from an external device through a Universal Serial Bus (USB) connection;

identifying, by the powered system, at least one power distribution rule;

allocating and distributing, by the powered system, a first power amount from the power received from the power source to the external device through the USB connection using the powered system load, the first power request, and the at least one power distribution rule;

receiving, by the powering system subsequent to receiving the first power request, a second power request from the external device through the USB connection; and allocating and distributing, by the powered system, a second power amount from the power received from the power source to the external device through the USB connection using the powered system load, the second power request, and the at least one power distribution rule, wherein the second power amount is different than the first power amount.

16. The method of claim 15, further comprising:

determining, by the powered system, a power budget using the power received from the power source;

wherein the powered system allocates and distributes the first power amount from the power received from the power source to the external device through the USB connection using the power budget; and wherein the powered system allocates and distributes the second power amount from the power received from the power source to the external device through the USB connection using the power budget.

17. The method of claim 15, further comprising:

determining, by the powered system, a first power budget using the power received from the power source, wherein the powered system allocates and distributes the first power amount from the power received from the power source to the external device through the USB connection using the first power budget; and determining, by the powered system, a second power budget using the power received from the power source, wherein the second power budget is different than the first power budget, and wherein the powered system allocates and distributes the first power amount from the power received from the power source to the external device through the USB connection using the second power budget.

18. The method of claim 15, wherein the powered system is configured to:

determining, by the powered system, a first powered system load, wherein the powered system allocates and distributes the first power amount from the power received from the power source to the external device through the USB connection using the first powered system load; and determining, by the powered system, a second powered system load that is different than the first powered system load, wherein the powered system allocates and distributes the second power amount from the power received from the power source to the external device through the USB connection using the second powered system load.

19. The method of claim 15, wherein the powered system is configured to:

identifying, by the powered system, at least one first power distribution rule, wherein the powered system allocates and distributes the first power amount from the power received from the power source to the external device through the USB connection using the at least one first power distribution rule; and identifying, by the powered system, at least one second power distribution rule that is different than the at least one first power distribution rule, wherein the powered system allocates and distributes the second power amount from the power source to the external device through the USB connection using the at least one power distribution rule.

20. The method of claim 15, wherein the first power amount expedites charging of a battery in the external device relative to the second power amount.

* * * * *